United States Patent [19]
Bell et al.

[11] Patent Number: 5,491,548
[45] Date of Patent: Feb. 13, 1996

[54] OPTICAL SIGNAL MEASUREMENT INSTRUMENT AND WIDE DYNAMIC RANGE OPTICAL RECEIVER FOR USE THEREIN

[75] Inventors: Florian G. Bell; William A. Trent; Alexander R. Lopez, all of Bend, Oreg.

[73] Assignee: Tektronix, Inc., Wilsonville, Oreg.

[21] Appl. No.: 210,820

[22] Filed: Mar. 18, 1994

[51] Int. Cl.⁶ .................................................. G01C 19/64
[52] U.S. Cl. ........................ 356/73.1; 250/208.2; 356/224
[58] Field of Search ................................... 356/73.1, 224; 250/208.2

[56] References Cited

U.S. PATENT DOCUMENTS

| | | | |
|---|---|---|---|
| 4,507,615 | 3/1985 | Bateman | 328/142 |
| 4,812,038 | 3/1989 | Nazarathy et al. | 356/73.1 |
| 4,838,689 | 6/1989 | Neumann | 356/73.1 |
| 4,960,989 | 10/1990 | Liebenrood et al. | 250/227.15 |
| 5,012,140 | 4/1991 | Bateman | 307/491 |
| 5,013,907 | 5/1991 | Bateman | 250/227.12 |
| 5,028,775 | 7/1991 | Furukawa et al. | 356/73.1 X |
| 5,123,732 | 6/1992 | Gross et al. | 356/73.1 |
| 5,241,282 | 8/1993 | Poole | 328/145 |

OTHER PUBLICATIONS 250 km Nonrepeated Transmission Experiment at 1.8Gb/s Using LD Pumped $Er^{3+}$-Doped Fibre Amplifiers in IM/Direct Detection System, *Electronics Letters*, May 11, 1989, vol. 25, No. 10, pp. 662–664.

*Primary Examiner*—Vincent P. McGraw
*Attorney, Agent, or Firm*—William K. Bucher

[57] ABSTRACT

A wide dynamic range optical receiver has low and high sensitivity signal channels for converting first and second portions of an optical input signal into voltage values representative of the various portions of the optical input signal. The voltage signals are converted into digital values by a converting means and a reconstruction is performed in a combining means to produce a digital output representative of the optical input signal. The wide dynamic range optical receiver may be used in an optical signal measurement instrument, such as an optical time domain reflectometer, where the optical return signal from a fiber under test is coupled to the wide dynamic range optical receiver in first and second portions with the first portion having an optical power level substantially less than the second portion.

180 Claims, 9 Drawing Sheets

OPTICAL SIGNAL MEASUREMENT INSTRUMENT AND WIDE DYNAMIC RANGE OPTICAL RECEIVER FOR USE THEREIN

BACKGROUND OF THE INVENTION

The present invention relates to optical signal measurement instruments and more particularly to an optical signal measurement instrument having a wide dynamic range optical receiver for measuring optical signals having wide dynamic ranges, such as in optical time domain reflectometers, optical power meters, and the like.

Optical time domain reflectometers (OTDR) are used for examining optical transmission lines, such as fiber optic cables, for losses and breaks that affect the transmission quality of the lines. The OTDR contains a laser or lasers for generating optical pulses that are launched into a fiber under test via an optical coupler or optical switch. During time intervals between pulses, light reflected back from the fiber is coupled through the optical coupler or switch to an optical receiver. The receiver converts the return optical signal into an electrical signal, which is amplified and converted to digital values for storage and additional signal processing. The return optical signal from an optical fiber under test is composed of a Rayleigh backscatter component and possible reflective components. The Rayleigh backscatter is reflected light caused by impurities and minute imperfections in the fiber and in a good fiber has an exponential decay as a function of fiber length. The reflective components are caused by mechanical splices or breaks in the fiber that reflect substantial portions of the outgoing optical pulse.

The dynamic range of an OTDR is generally given as the one-way difference in db between the extrapolated backscatter level at the start of the fiber and the point where the signal to noise ratio equals one. The backscatter dynamic range is a function of the total optical power launched into the fiber under test, the sensitivity of the optical receiver in the OTDR, and the amount of averaging performed on the return optical signal. For example, the optical dynamic range of a TFP2 Optical Time Domain Reflectometer using a FS1300 Laser Plug-in Module, manufactured and sold by Tektronix, Inc. of Wilsonville, Oreg., is given as 29.5 dB for a 1000 meter pulse from a 1310 nm laser source into a single mode optical fiber. In addition to dynamic range as defined by the backscatter component, a larger dynamic range is required of the optical receiver in the OTDR if it is to completely display all of the reflective components in the optical return signal. To cover the full range of scattering and reflections requires an OTDR having an optical receiver with a dynamic range in the order of 50 dB optical or 200 dB electrical.

The telecommunications industry is experimenting with erbium doped fiber amplifiers in nonrepeated transmission systems of over 200 km in length. A paper entitled "250 km Nonrepeated Transmission experiment at 1.8 Gb/s Using LD Pumped $Er^{3+}$-Doped Fibre Amplifiers in IM/Direct Detection System" by Hagimoto et al., in Electronic Letters, Vol. 25, No. 10, May 11, 1989, describes a direct detection, nonrepeated transmission system over a 250 km low loss dispersion shifted single mode fiber. Erbium doped fiber amplifiers, pumped with 1480 nm lasers, were used as a post amplifier for the launched optical pulses into the fiber and as a preamplifier on the receiver end. A signal gain of 12.4 dB was obtained at an average output power level of +12.2 dBm using a 90 meter postamplifer. U.S. Pat. No. 5,013,907 describes the use of laser amplifiers and fiber amplifiers in OTDRs where the fiber amplifier increases the optical output power of the launched pulses into the fiber under test. In addition, the optical return signal from the fiber under test is amplified by the fiber amplifier. Using fiber amplifiers in OTDRs substantially increases the need for a wide dynamic range optical receiver that can accommodate the greater optical dynamic range of OTDRs with laser amplifiers.

An optical receiver in an OTDR has a photosensitive device that converts the optical return signal into an equivalent current signal. The current signal is converted into an equivalent voltage signal, which in most OTDR's is sampled and stored as digital values. The conversion of the current signal to an electrical signal is accomplished using either logarithmic amplifiers or linear amplifiers. Logarithmic amplifiers are used to compress the input current signal, which has an electrical dynamic range as high as 200 dB, into an output having a small dynamic range. An advantage of using logarithmic amplifiers is that close-in reflective components of the optical input signal may be completely converted to a voltage signal.

U.S. Pat. No. 4,507,615 describes a non-linear amplifier system usable in an OTDR. A current signal from a photodetector is coupled to an input terminal of a first logarithmic amplifier stage that includes a diode connected to the input of the amplifier. The diode develops a voltage there across which is a logarithmic function of the input current signal. The first logarithmic amplifier stage amplifies low input signal levels linearly and higher input signal levels non-linearly. The output of the first amplifier stage is coupled to a second logarithmic amplifier, similar to the first stage, by way of an intermediate limiter stage. The limiter and correction stage linearly amplifies the input signal levels corresponding to low input signal levels of the first amplifier stage. The second amplifier stage amplifies non-linearly the input signals corresponding to the low input signal levels of the first amplifier stage. A combining stage combines the output voltage signals of the first and second amplifier stages and the limiter and correction stage. For a range of low input signal levels, the output voltage signal of the combining stage is representative of the output voltage signal of the second amplifier stage. For a range of high input signal levels, the output voltage signal of the combining stage is representative of the output voltage signal of the first and second amplifier stages. For a crossover range of input signal levels, the output voltage signal of the combining stage is representative of the output voltage signal of the second amplifier stage.

U.S. Pat. No. 5,012,140 describes a logarithmic amplifier with gain control having a reduced system noise floor and increased dynamic range for use in an OTDR. The log amplifier uses a diode for logging the input current signal to a transimpedance amplifier with the current to log voltage transfer function gain controlled with feedback from the amplifier to the log diode. The gain of the log response is adjusted by the feedback gain of a feedback amplifier independent of the transimpedance amplifier gain. Further improvement in the dynamic range is realized by compensating for the negative effects of resistive component of the diode using the feedback amplifier in conjunction additional diode circuitry.

U.S. Pat. No. 4,960,989 describes an optical time domain reflectometer having a receiver with selectively controlled gain. The receiver has an amplification block consisting of series connected transimpedance amplifiers. The gain of each amplifier stage is controlled by a photoconductive switch coupled to second amplification and trigger block.

The purpose of this configuration is to decrease the gain of the amplification block in the presence of a reflective component in the optical input signal so as not to saturate any of the amplifiers in the amplification block. A splitter is provided to split the optical return signal between the amplification block and the trigger block. The optical signal in the trigger block is converted to a current signal and is amplified by a logarithmic amplifier. The output of the log amplifier is coupled to one input of a trigger comparator, which receives a trigger level signal at a second input from a controller. The trigger comparator outputs a signal to a laser driver amplifier when the log amplifier signal exceeds the trigger level signal. The laser driver amplifier supplies a current to a laser diode, which emits light at 830 nm that is optically coupled to the photoconductive switches in the amplification block.

U.S. Pat. No. 5,123,732 describes a current to voltage converter for an OTDR where a voltage clipping diode is connected between the input port of the current to voltage converter and a fixed potential to limit the maximum value of the input voltage appearing at the input port. The maximum output voltage is the product of the gain of the amplifying means of the converter and the maximum input voltage to the converter as limited by the clipping diode. The use of the clipping diode prevents the saturation of the amplifier in the converter.

Offsetting the advantages of using logarithmic amplifiers in OTDR's are the disadvantages of design, manufacture, and maintain expenses. Advantages of using linear amplifiers in OTDR receivers are ease of design, manufacture, and support. However, a major disadvantage of using linear amplifiers is that they clip the tops of close-in reflective events because they do not have the dynamic range necessary for displaying close-in reflective components of the optical return signal. To achieve the same dynamic range as log amplifiers would require gain switching for the linear amplifier or separate gain stages. This introduces complexity along with the possibility of generating excess noise. The '989 patent is an example of optical receiver having gain switch limiting but, to keep the noise low, the signals are clipped below the 50 dB level.

What is needed is an optical signal measurement instrument, such as an OTDR or the like, having a wide dynamic range for measuring and displaying the full return optical signal without clipping close-in reflective events. Such an optical signal measurement instrument requires an optical receiver having a wide dynamic range capable of accurately converting the optical signal into an electrical signal representative of the optical return signal. In addition, the optical receiver in such an optical signal measurement instrument needs to be capable of accurately reproducing optical signals that have been amplified by fiber amplifiers or the like. Additionally, the optical signal measurement instrument needs an optical receiver that is simple in design and easy to manufacture and support. Further, it would be desirable to have an optical signal measurement instrument where the optical receiver uses linear amplifiers that have better signal to noise ratios than existing logarithmic amplifiers and have less amplifier tail than log amplifiers.

SUMMARY OF THE INVENTION

Accordingly, the present invention is a wide dynamic range optical receiver for use in an optical signal measurement instrument, such as an optical time domain reflectometer, having low and high sensitivity signal channels for converting a first portion of an optical input signal and a second portion of the optical input signal into voltage signals representative of the optical input signal. The voltage signals from the low and high sensitivity signal channels are converted to digital values representative of the various portions of the optical input signal by an analog-to-digital converter coupled to the low and high sensitivity channels by a switch. Alternately, first and second A/D converters may be coupled to the low and high sensitivity signal channels. The digital values are combined in a combining means to produce a composite digital output representative of the optical input signal. In the preferred embodiment, the first portion of the optical input signal has ten percent or less of the optical input signal and the second portion of the optical input signal has ninety percent or more the optical input signal.

The low and high sensitivity signal channels have respective first and second photosensitive devices for converting the respective first and second portions of the optical input signal to current signals. The first photosensitive device may be a unity gain device and the second photosensitive device may be a variable gain device having a voltage biasing means for producing a first and second gain in the device. The low and high sensitivity signal channels further have first and second amplifiers for converting the first and second current signals into respective voltage signals. In the preferred embodiment, the amplifiers are linear amplifiers but nonlinear amplifiers may be used to further increase the dynamic range of the optical receiver. The second photosensitive device produces first and second current outputs representative of the second portion of the optical input signal as a function of the first and second gains on the device.

Alternatively, the low and high sensitivity channels may be coupled to a single variable gain photosensitive device having a voltage biasing circuit for producing different gain the photosensitive device. A switch is provided to couple the variable gain photosensitive device to the low and high sensitivity signal channels.

Additionally, means are provided for storing the digital values from the low and high sensitivity signal channels. The combining means further includes means for retrieving the digital values representative of the various portions of the optical input signal and correcting for variations in amplitude levels between the various portions of the optical input signal as a function of applying magnitude correction values to the digital values representative of the various portions of the optical input signal. The combining mean also includes means for constructing the composite digital output representative of the optical input signal as a function of correlating in time the respective digital values representative of the first and second portions of the optical input signal and determining common overlapping regions between the various portions with no events where the low and high sensitivity signal channels are not noisy nor saturated.

In a further aspect of the invention, various types of optical splitters may be used to produce the first and second portion or alternately the first and second optical signals of the optical input signal. One type of optical splitter has an optical coupler for dividing the optical input signal into the first and second optical signals with the first optical signal having ten percent or less of the optical power of the optical input signal and the second optical signal having ninety percent or more of the optical power of the optical input signal. Another type of optical splitter has an optical coupler for equally dividing optical power of the optical input signal between first and second output ports. One of the output ports outputs the second optical signal and the other port has an optical attenuator coupled thereto for attenuating the optical power of the optical input signal to produce the first optical signal.

Another embodiment of the optical splitter has an optical switch with first and second optical paths coupled to a common optical path and responsive to an input signal for selectively coupling the optical input signal on the common optical path between the two paths. The output of one path has an optical attenuator for attenuating the optical input signal to produce the first optical signal and the other path outputs the optical input signal as the second optical signal. In still another embodiment, the optical splitter has first and second optical switches with each optical switch having first and second optical paths coupled to a common optical path and responsive to respective input signals. The first optical paths of the optical switches are coupled together through an optical attenuator and the second optical paths are directly coupled together. The two optical switches work in conjunction to selectively couple the optical input signal on the first optical switch common path to the second optical switch common path along the first paths and second paths. The first path containing the optical attenuator attenuates the optical input signal to produce the first optical signal and the second paths directly couple the optical input signal to produce the second optical signal.

The optical signal measurement instrument may be implemented in an optical time domain reflectometer having at least one optical pulse generating device having a variable gain for generating an optical pulse output for launching into an optical fiber under test. The variable gain on the optical pulse generating device permits the generation of an optical pulse output with more than one optical power level. A coupling means in the form of an optical coupler or an optical switch couples the optical pulse output into the optical fiber under test and an optical return signal from the fiber into an optical splitter. Alternately, the optical time domain reflectometer may include an optical amplifier for increasing or decreasing the optical power of the optical pulse output. Additionally, the optical amplifier may be configured to also increase the optical power of the optical return signal from the fiber under test. The optical splitter receives the optical return signal from the optical fiber under test and divides it into a first and second optical signals with the first optical signal having an optical power level substantially less than the second optical signal. A low sensitivity signal channel is coupled to receive the first optical signal and has a unity gain photosensitive device and a first linear amplifier for converting the first portion of the optical return signal into a voltage signal representative of the first optical signal. A high sensitivity signal channel is coupled to receive the second optical signal and has a variable gain photosensitive device and a second linear amplifier for converting the second optical signal into first and second voltage signals representative of the second optical signal as a function of first and second gains of the variable photosensitive device. The low and high sensitivity signal channels are coupled to a converting means for converting the voltage signals therefrom into digital values representative of the various portions of the optical input signal. The digital values representative of the voltage signal from the lower sensitivity signal channel and digital values representative of the first and second voltage signals from the high sensitivity signal channel are combined in a combining means to produce a composite digital representation of the optical input signal as a function of correlating in time the respective digital values representative of the voltage signal from the low sensitivity signal channel and the first and second voltage signals from the high sensitivity signal channel and determining common overlapping regions between the respective digital values where no events exist and where the low and high sensitivity signal channels are not noisy nor saturated. The digital output may be passed through an infinite impulse response filter for removing high frequency noise from the digital output.

Alternatively, the low and high sensitivity channels in the optical time domain reflectometer may be coupled to a single variable gain photosensitive device having a voltage biasing circuit for producing different gains in the photosensitive device. A switch is provided to couple the variable gain photosensitive device to the low and high sensitivity signal channels.

A method is also described for producing a digital output representative of an optical input signal that includes the steps of splitting the optical input signal into first and second optical signals having first and second optical power levels, converting the first optical signal into at least one voltage signal representative of a first portion of the optical input signal using a low sensitivity signal channel, converting the second optical signal into at least one voltage signal representative of a second portion of the optical input signal using a high sensitivity signal channel, converting the voltage signals from the respective low and high sensitivity signal channels into digital values representative of the various portions of the optical input signal, and combining the digital values representative of the various portions of the optical input signal to produce a composite digital output representative of the optical input signal.

The converting steps for the first and second optical signals further includes the steps of selectively coupling the first and second optical signals to a variable gain photosensitive device, applying different gains to the photosensitive device for generating a first current signal representative of the first optical signal in response to a first gain and a second current signal representative of the second optical signal in response to a second gain, and coupling the current signals representative of the first and second optical signals to respective first and second amplifiers for converting the currents signals into first and second voltage signals representative of the first and second portions of the optical input signal. Alternatively the first and second optical signal converting step may include coupling the first and second optical signals to respective photosensitive devices for converting the first and second optical signals into current signals, and coupling the current signals representative of the first and second optical signals to respective first and second amplifiers for converting the currents signals into first and second voltage signals representative of the first and second portions of the optical input signal. Alternately, the applying step may include the steps of applying a first gain to the photosensitive device for generating a first current signal representative of the first optical signal and second and third gains to the photosensitive device for generating second and third current signals representative of the second optical signal and coupling the current signals representative of the first and second optical signals to respective first and second amplifiers for converting the first current signal into a first voltage representative of the first portion of the optical input signal and second and third voltages representative of the second portion of the optical input signal. In a further alternative, the first coupling step includes the steps of coupling the first optical signal to a unity gain photosensitive device and coupling the second optical signal to a variable gain photosensitive device, and applying first and second gains to a variable gain photosensitive device for generating first and second current signals representative of the second optical signal.

The applying step also includes the steps of generating an additional optical input signal having a reduced power level, and generating an additional current signal representative of the first optical signal as a function of the reduced power level of the additional optical input signal using the first gain of the photosensitive device.

The combining steps further includes the steps of correcting for variations in amplitude levels between the various portions of the optical input signal as a function of applying magnitude correction values to the digital values representative of the various portions of the optical input signal, and constructing the composite digital output representative of the optical input signal as a function of correlating in time the respective digital values representative of the first and second portions of the optical input signal and determining common overlapping regions between the various portions with no events where the low and high sensitivity signal channels are not noisy nor saturated, and filtering the digital output for removing high frequency noise.

A method is also described for generating magnitude correction values for the digital values representative of the various portions of the optical return signal in the optical time domain reflectometer. The method includes coupling a known optical fiber to the optical time domain reflectometer(OTDR), coupling an optical attenuator in the optical return signal path of the OTDR, configuring the OTDR for acquiring data from the low sensitivity signal channel, acquiring the digital data and storing the data. Additional steps include configuring the OTDR for acquiring data from the high sensitivity signal channel with the APD set at low gain, adding attenuation in an amount equal to the gain between the low and high sensitivity signal channels, acquiring data and storing the data. A further step is comparing the data from the two acquisitions over a known portion of the good fiber, determining that the digital values are not noisy nor represent saturated signal channels, and determining the magnitude correction value for the last acquisition from the difference in the digital values over the known fiber region. Steps that are repeated for additional portions of the optical return signal are reconfiguring of the OTDR, adding attenuation to the optical return signal channels, acquiring more data, comparing the new data with the last acquired data over the known fiber region and determining the magnitude correction value for the last acquisition from the difference in the digital values over the known fiber region. The objects, advantages and novel features of the present invention are apparent from the following detailed description when read in conjunction with appended claims and attached drawings.

DETAILED DESCRIPTION OF THE PREFERRED EMBODIMENT

Figure 1:
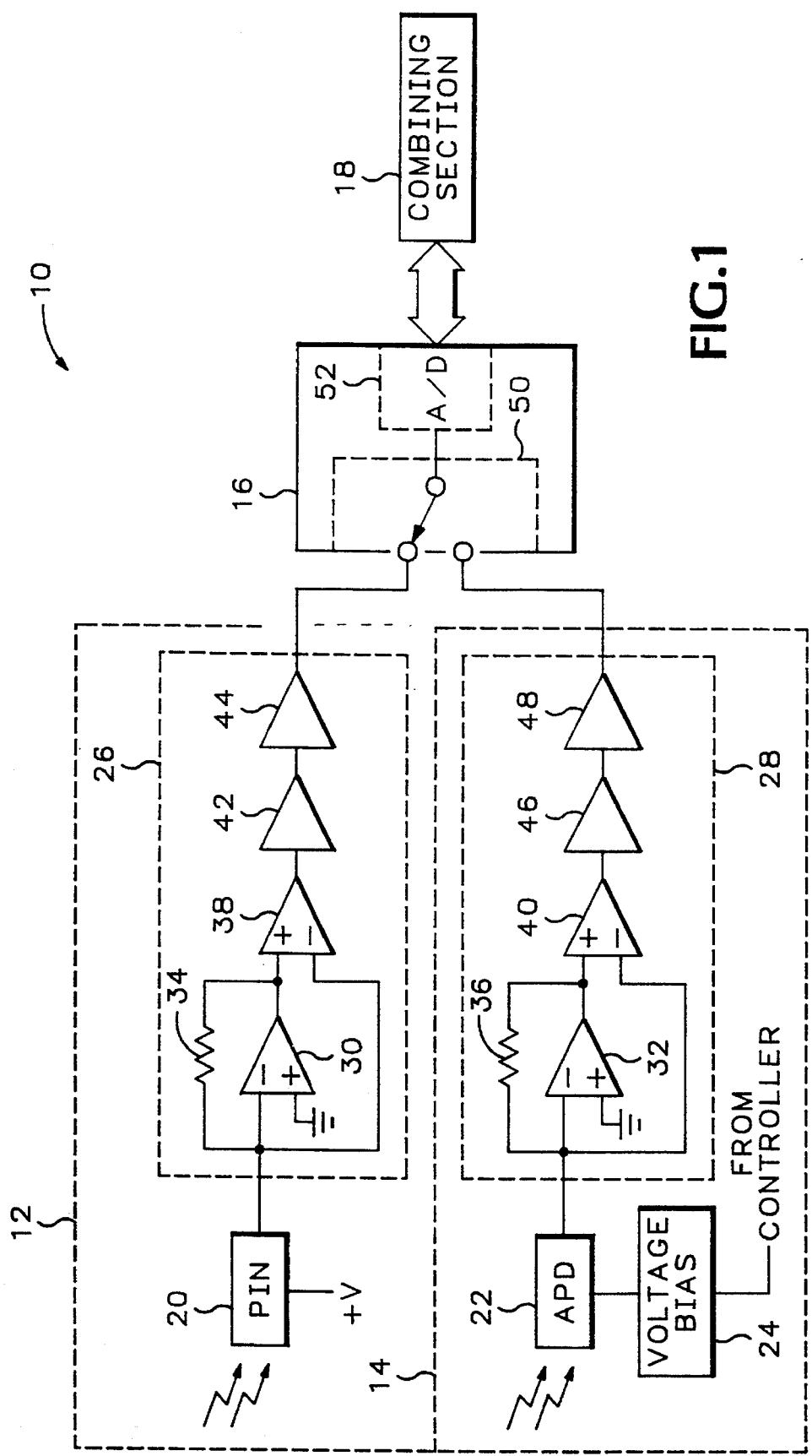
FIG. 1 is a block diagram of one embodiment of the wide dynamic range optical receiver according to the present invention.

Referring to FIG. 1, there is shown a block diagram of a wide dynamic range optical receiver 10 for use in an optical signal measurement instrument, such as an optical time domain reflectometer, optical power meter, optical spectrum analyzer, or the like. The optical receiver 10 has a low sensitivity signal channel 12 and a high sensitivity signal channel 14 for converting an optical input signal into voltage signals representative of portions of the optical input signal. The voltage outputs of the channels 12 and 14 are coupled to a digital conversion section 16 for conversion into digital values representative of the various portions of the optical input signal. The digital values from the digital conversion section 16 are coupled to a combining section 18 where the digital values are combined to produce a composite digital output representative of the optical input signal.

In the broadest aspect of the present invention, the optical input signal to the optical receiver 10 has at least two portions with one portion having a substantially reduced optical power level than the other portion. These two portions may be viewed as first and second optical signals of the optical input signal. The first optical signal is coupled to the low sensitivity signal channel 12 and the second optical signal is coupled to the high sensitivity signal channel 14. The low and high sensitivity signal channels 12 and 14 are of similar design with the low sensitivity signal channel 12 having a first photosensitive device 20 coupled to receive the first optical signal. Preferably, the first photosensitive device is a unity gain PIN photodiode. However, it is possible to use an avalanche photodiode (APD) having a biasing voltage that produces unity gain or a gain of two. The high sensitivity signal channel 14 has a second variable gain photosensitive device 22 coupled to receive the second optical signal. The variable gain photosensitive device 22 is a avalanche photodiode (APD) having a voltage biasing circuit 24 for producing different gains on the APD 22. PIN diode 20 and APD 22 convert the respective first and second optical signals of the optical input signal into current signals. The respective current signals are coupled to low and high sensitivity amplifiers 26 and 28. Amplifiers 26 and 28 are of the same design with the exception of the gains of the amplifiers. In the preferred embodiment, the gain difference between the low and high sensitivity amplifiers 26 and 28 is equivalent to an optical gain of 8.5 dB with the high sensitivity amplifier 28 having the higher gain. Amplifiers 26 and 28 include transimpedance amplifiers 30 and 32 having resistive feedback elements 34 and 36 and summing amplifiers 38 and 40. Transimpedance amplifiers 30 and 32 convert the current signals from the photosensitive device 20 and 22 to voltage signals. The input and output signal nodes of each amplifier 30 and 32 are coupled to respective summing amplifiers 38 and 40. Amplifiers 38 and 40 combine the signals on the input and output nodes to produce an output substantially free of amplifier errors. The circuitry of amplifiers 30, 38 and 32, 40 are described in greater detail in co-pending U.S. Pat. No. 5,410,282, issued Apr. 25, 1995, and entitled "Wide Dynamic Range Amplifier with Error Correction". The voltage outputs of summing amplifiers 38 and 40 are respectively coupled to additional amplifier stages 42 and 44 and 46 and 48 for increasing the voltage signal to levels suitable for use by the digital conversion section 16. The digital conversion section 16 contain a switch 50 for selectively coupling the voltage signals from the low and high sensitivity signal channels 12 and 14 to an analog-to-digital (A/D) converter 52. The voltage on the input of the A/D 52 is approximately two volts. The A/D 52 converts the respective voltage signal to digital values representative of the various portions of the input optical signal. Alternately, separate analog-to-digital converters may be connected to each channel 12 and 14 of the optical receiver 10. The digital values from the digital conversion section 16 are stored in an appropriate storage device, such as a random access memory (RAM). The combining section 18 retrieves the digital values and constructs the composite digital output of the optical input signal.

Figure 2:
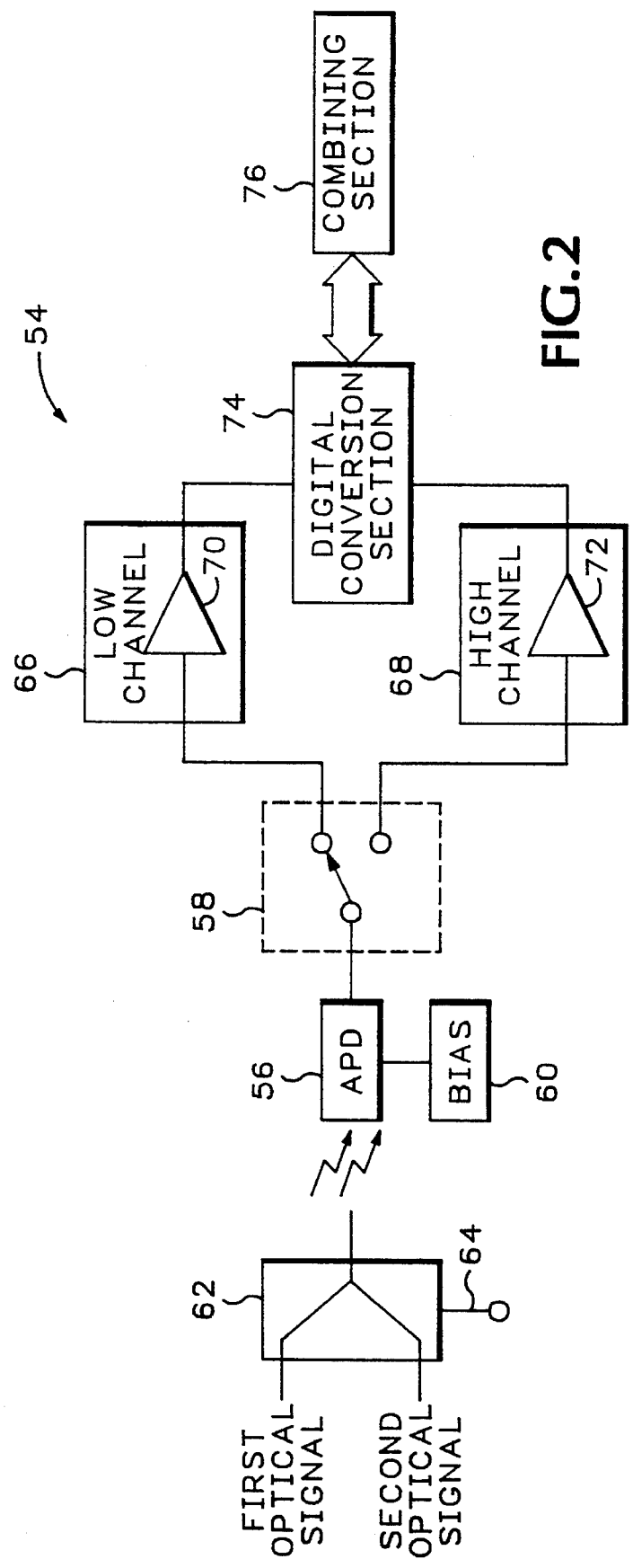
FIG. 2 is a block diagram of an alternative embodiment of the wide dynamic range optical receiver according to the present invention.

FIG. 2 show an alternative wide dynamic range optical receiver 54 where the photosensitive devices 20 and 22 of receiver 10 are replaced with a single variable gain photosensitive device 56 and a switch 58. Variable gain photosensitive device 56 is an APD photodiode having a voltage biasing circuit 60 for applying different gains to the APD 56. An optical switch 62 having first and second optical paths coupled to a common optical path is used to selectively couple the first and second optical signals of the optical input signal to the APD 56. The first and second optical signals on the first and second optical paths of optical switch 62 are coupled to the common optical path in response to an input signal on line 64. The input signal on line 64 may be an acoustic or electrical signal depending on the type of optical switch used. Switch 58 connects the current outputs of the APD 56 to the low and high sensitivity signal channels 66 and 68 having amplifiers 70 and 72. Amplifiers 70 and 72 are of the same design as described for optical receiver 10. The voltage outputs of the low and high sensitivity signal channels 66 and 68 are coupled to the digital conversion section 74 for conversion to digital values. The digital values are coupled to the combining section 76 for constructing the composite digital output representative of the optical input signal.

The optical input signal to the wide dynamic range optical receivers 10 and 54 has been described as having at least two portions referred to as the first and second optical signals with one portion having substantially less optical power than the other. An optical signal having an optical dynamic range of 50 dB requires an amplifier having an electrical dynamic range of 200 dB. Existing linear amplifiers do not have this range. An amplifier designed for large optical signals will have a low sensitivity to optical signals close to the electrical noise floor of the amplifier. That is small optical signals will buried in the electrical noise floor of the amplifier. An amplifier designed for small optical signal levels will have a high sensitivity to optical signals far away from the electrical noise floor of the amplifier. That is large optical signals will saturate the amplifier. By dividing the optical power of an optical input signal into two portions having substantially different optical power levels and applying these two portions to respective low and high sensitivity signal channels, an optical receiver is produced that has an equivalent electrical dynamic range that is substantially greater than the electrical dynamic range of a single channel optical receiver.

The first portion or first optical signal of the optical input signal having the substantially reduced optical power level is coupled to the PIN photodiode 20 of optical receiver 10. Diode 20 converts the first optical signal into a current signal. The current signal is coupled to amplifier 26 which converts the current signal into a voltage signal representative of a first portion of the optical input signal. That portion of the optical signal represented by the voltage signal is above the electrical noise floor of the amplifier 26. The voltage signal is coupled to the digital conversion section 18 for converting into digital values, which are stored in RAM. The second portion or second optical signal of the optical input signal having the substantially higher optical power level is coupled to the variable gain APD 22 of the optical receiver 10. The gain of APD 22 is set at two levels by the voltage bias circuit 24. The low gain on the APD 22 is set for approximately 1.5 Amp/watt and the high gain is set for 32 Amp/watt. The difference in the gain levels on APD 22 produce an equivalent optical gain of approximately 6.5 dB. The total difference in the gain levels between the low sensitivity signal channel and the high sensitivity signal channel with high gain on the APD 22 is approximately 15 dB with the inclusion of the approximate 8.5 dB of gain difference between the amplifiers 26 and 28. APD 22 converts the second optical signal into a first current signal at the low gain setting and couples the first current signal to amplifier 28. Amplifier 28 converts the first current signal to a voltage signal representative of another portion of the optical input signal. The voltage output is coupled to the digital conversion section for converting into digital values, which are stored in RAM. The gain on the APD 22 is set to the high gain and the APD 22 converts the second optical signal to a second current signal which is coupled to amplifier 28 and converted to a voltage signal representative of a further portion of the optical input signal. The voltage output is coupled to the digital conversion section for converting into digital values, which are stored in RAM. Those portions of the optical input signal that are represented by the voltage signals from amplifier 28 are below the saturation level of amplifier 28 and above the electrical noise floor of the amplifier 28. It is possible by careful design to build amplifiers 26 and 28 with adequate electrical dynamic range to where the APD 22 is not required to operate in the dual gain mode for the second optical signal. In this case, a single gain is applied to the APD 22 to produce a single current output, which is converted to a voltage signal representative of the second portion of the optical input signal.

The optical receiver 54 of FIG. 2 operates in a similar manner to receiver 10 in that the first and second optical signals are converted to voltage signals, converted to digital values, and stored. However, receiver 54 uses a single variable gain APD 56 and a switch 60 instead of the individual PIN diode 20 and APD 22 as used in receiver 10. The first and second optical signals are also input to the APD 56 via the optical switch 62. With the optical switch 62 positioned to pass the first optical signal, the gain on the APD 56 is set to approximately 1.5 Amp/Watt by the voltage biasing circuit 60. Switch 58 is set to the low sensitivity signal channel 66. The first optical signal is converted to digital values through the same optical-to-current, current-to-voltage, and voltage to digital process previously described for receiver 10. Optical switch 62 is switched to couple the second optical signal to the APD 56 and the gain on the APD 56 is set to approximately 1.5 Amp/watt by the voltage biasing circuit 60. Switch 58 is set to the high sensitivity signal channel 68. The second optical signal is converted to digital values using the low gain on the APD 56 through the same optical-to-current, current-to-voltage, and voltage to digital process previously described for receiver 10. The gain on the APD 56 is set to the high gain setting of approximately 32 Amp/watt and the second optical signal is also converted to digital values as previously described. As was stated for receiver 10 it is possible by careful design to build the amplifiers 70 and 72 with adequate electrical dynamic range to where the APD 56 is not required to operate in the dual gain mode for the second optical signal. In this case, two gains are applied to the APD 56 to produce the current outputs for the low and high sensitivity signal channels.

The stored digital values representative of the various portions of the optical input signal are retrieved by the combining section 18 or 76 to construct the composite digital output representative of the optical input signal. The combining section includes a controller, such as a microprocessor or the like, under program control that correlates in time the digital values representative of the various portions of the optical input signal. Common overlapping regions between the various portions of the optical input signal are determined where there are no anomalous signal events, such as spikes or the like. Additionally, the digital values in the common overlapping regions do not represent electrical noise nor saturations from the low and high sensitivity signal channels.

Figure 3A:
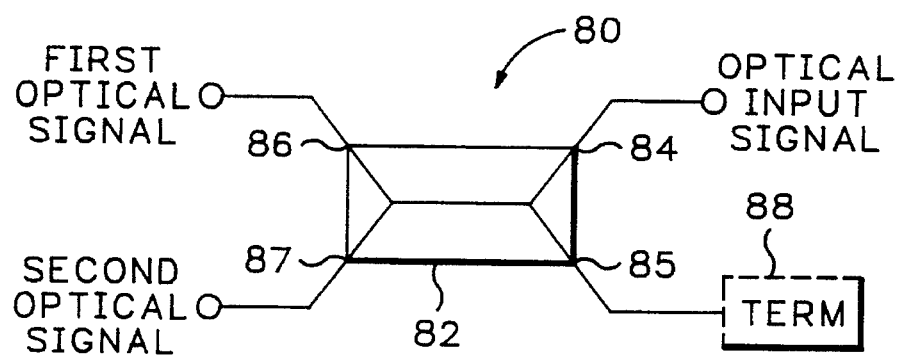
FIGS. 3A–3D are representations of various optical splitters used in conjunction with the wide dynamic range optical receiver in an optical signal measurement instrument according to the present invention.

Optical receivers 10 and 54 have been described as receiving an optical input signal having first and second portions or first and second optical signals with the first portion or signal having an optical power level substantially less than the second portion or signal. A variety of optical devices may be used to produce the various portions or signals of the optical input signal. FIGS. 3A—3D show various configurations of optical splitters for use in an optical measurement instrument having the wide dynamic range optical receivers 10 or 54. Referring to FIG. 3A, there is shown an optical splitter 80 consisting of an optical coupler 82 having input ports 84 and 85 and output ports 86 and 87. Termination 88 is coupled to unused port 85. The coupler divides the optical input signal on the input port 84 into a first optical signal having ten percent or less of the optical input power and a second optical signal having ninety percent or more of the optical input power. The exact ratio of optical power between the first and second optical signals is a function of the coupler design and the wavelength of the optical input signal. For example an optical coupler manufactured and sold by Gould, Inc., Fiber Optics Division, under part No. 242397 and described as a 1270/1600-COS-1/99-02X02 single mode wavelength independent coupler (WIC), Series S, divides a 1310 nm optical input signal into a 98%/2% ratio and a 1550 nm optical input signal into a 96%/4% ratio. The first optical signal is coupled out of port 86 to the low sensitivity signal channel and the second optical signal is coupled out of port 88 to the high sensitivity signal channel.

Figure 3B:
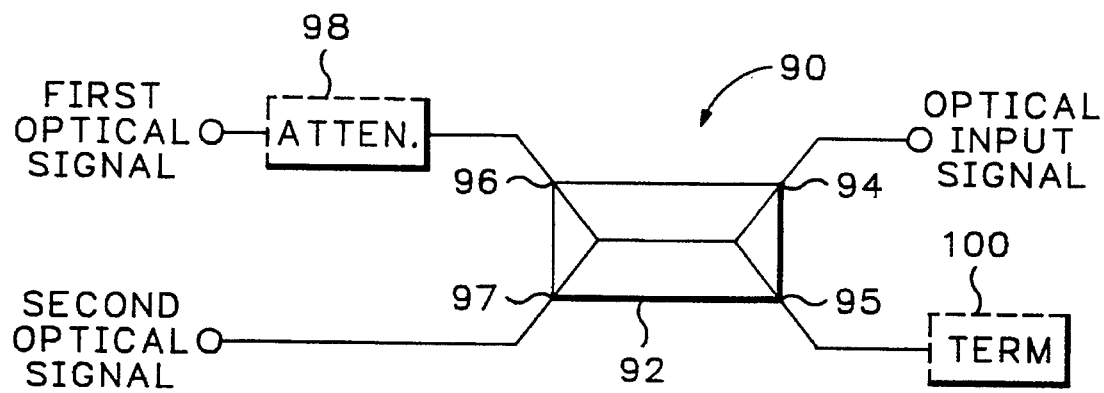

Referring to FIG. 3B, there is shown a second an optical splitter 90 consisting of an optical coupler 92 having an input port 94 and 95 and output ports 96 and 97 and an optical attenuator 98. Termination 100 is coupled to unused port 95. The optical coupler 92 is preferably a 50/50 coupler where the optical input signal on the input port 94 is equally divided between the two output ports 96 and 97. The optical attenuator 98 is coupled to one of the output ports, such as port 96, for attenuating the optical signal from the port to produce the first optical signal. The second optical signal is coupled directly from the other optical port 97.

Figure 3C:
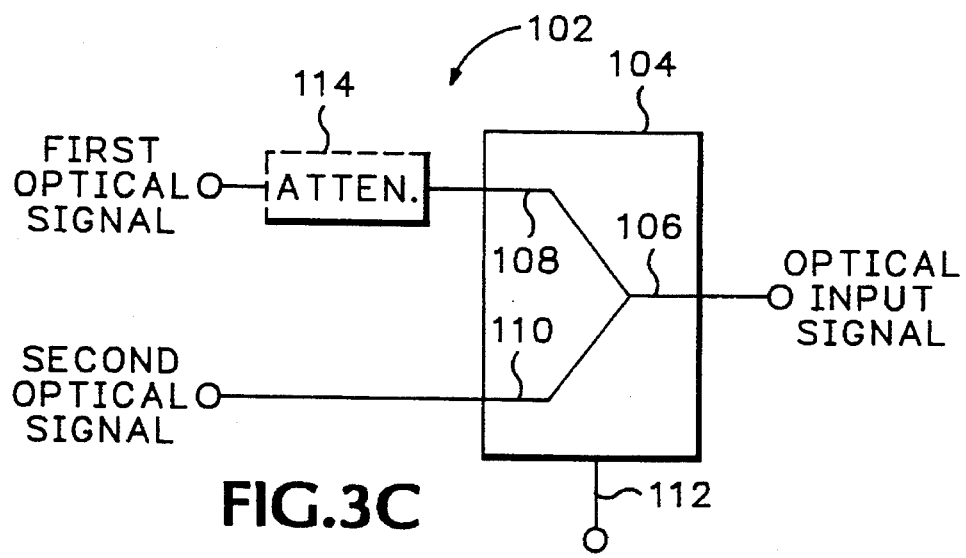

FIG. 3C shows a further optical splitter 102 having an optical switch 104 with a common optical path 106 selectively coupled to first and second optical paths 108 and 110 in response to an input signal on line 112. The input signal may be an acoustic signal or electrical signal depending on the type of optical switch 104 used. The optical output from one of the optical paths, such as path 108, is coupled to attenuator 114. The optical output from attenuator 114 is the first optical signal having a substantially reduce optical power level. The optical output from the second optical path is the second optical signal, which is equivalent to the optical input signal.

Figure 3D:
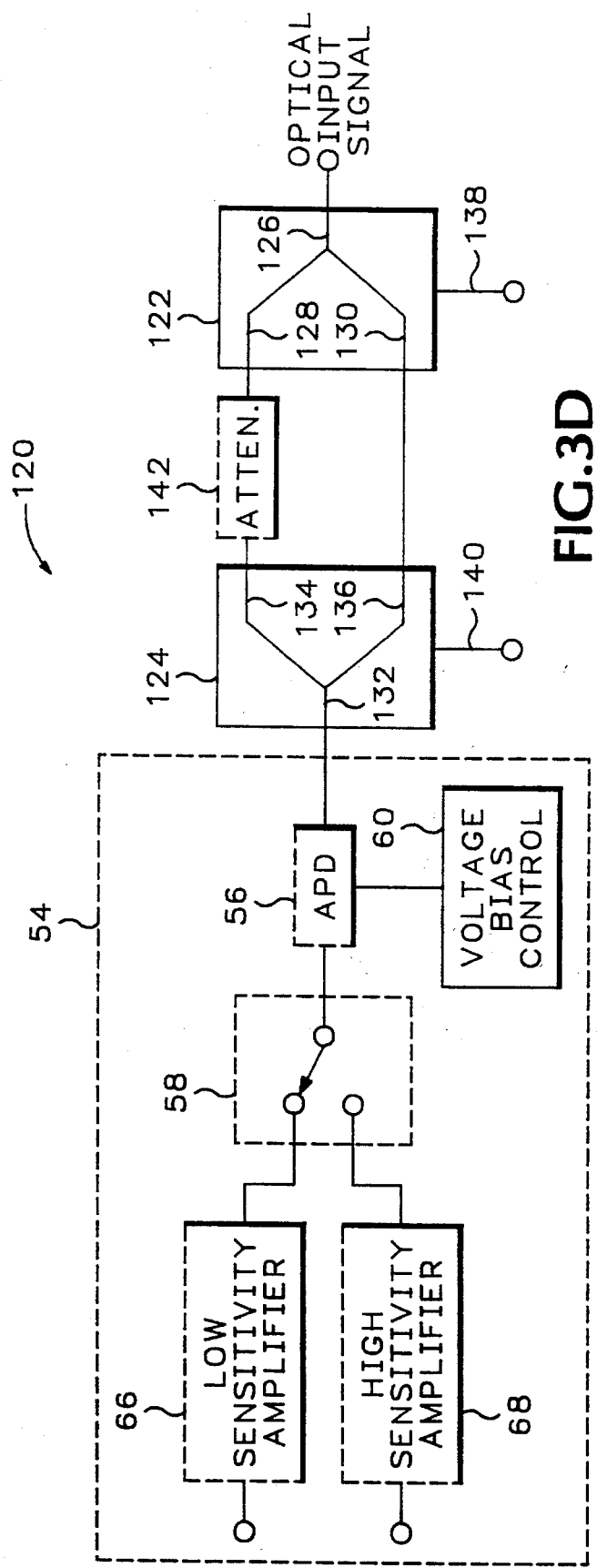

FIG. 3D shows a example of an optical splitter 120 having two optical switches 122 and 124. Optical switch 122 has a common optical path 126 selectively coupled to first and second optical paths 128 and 130. Optical switch 124 has a common optical path 132 selectively coupled to first and second optical paths 134 and 136. Each switch 122 and 124 receives switching input signals on lines 138 and 140 for selectively coupling the respective common optical paths 126 and 132 to the first optical paths 128 and 134 and the second optical paths 130 and 136. First optical paths 126 and 132 are coupled together through attenuator 142 while the second optical paths 130 and 136 are directly coupled together. With the common optical paths 126 and 132 respectively coupled to the first optical paths 128 and 134 through attenuator 142, attenuator 142 attenuates the optical input signal on the first optical paths 1284 and 134 to produce the first optical signal having the reduced optical power level. With the common optical paths 126 and 132 respectively coupled to the second optical paths 130 and 136, the optical input signal on the second optical paths is the second optical signal. The first and second optical signal on the common optical path 132 of optical switch 124 are coupled to the optical receiver 54 previously described.

Figure 4:
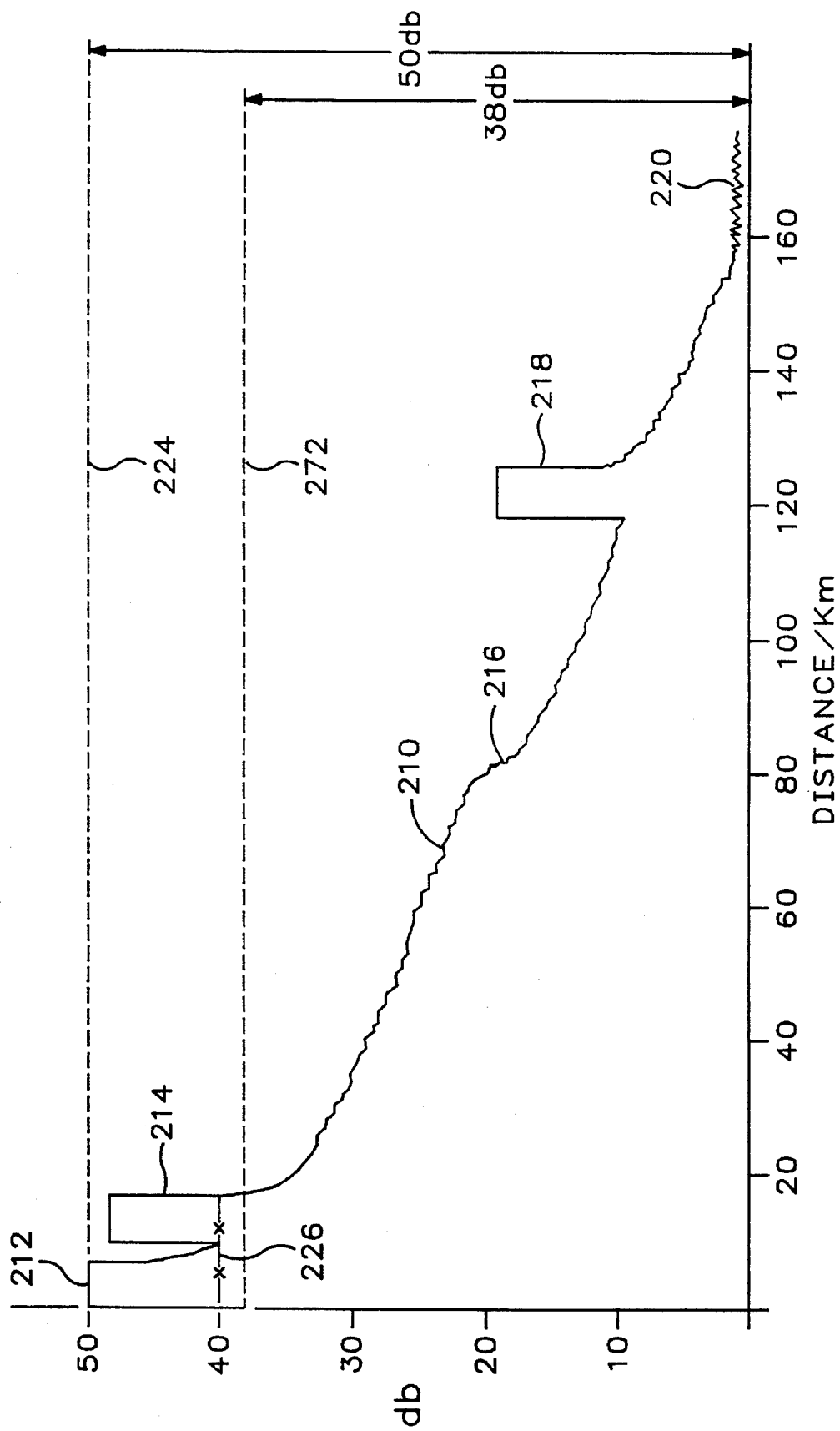
FIG. 4 is a graphical representation of an optical return signal from a fiber under test interrogated by an optical time domain reflectometer showing the need for the wide dynamic range optical receiver according to the present invention.

The need for a wide dynamic range optical receiver for an optical signal measurement instrument is best shown with reference to a graphical representation of an optical return signal from a fiber under test interrogated by optical pulses generated by an optical time domain reflectometer (OTDR) as shown in FIG. 4. The vertical axis of FIG. 4 is in dBs and the horizontal axis is in kilometers of distance along the fiber from the front panel of the OTDR. The graphical representation shows an exponentially decaying backscatter signal 210 having a number of fiber events associated with it. Since the vertical scale of the graphical representation is in Dbs, the backscatter signal appears linear. The first event 212 is a high amplitude reflective event associated with the front panel connector of the OTDR. The next event 214 is a reflective event close to the front panel event 212. Farther along the fiber is a non-reflective event 216 and another reflective event 218. The backscatter signal 210 continues to decrease until it falls within the noise floor of the OTDR at 220. Current practice in the optical fiber test equipment industry is to define the maximum dynamic range for an OTDR as the extrapolated one-way difference in dbs of the backscatter from the start of the fiber to a point where the signal to noise ratio is equal to one. The maximum dynamic range of the OTDR directly relates to the maximum distance along the fiber that the OTDR can examine. Current long range OTDRs have dynamic ranges in the mid to high thirty db range. As an example, the TFP2 Optical Time Domain Reflectometer with a long range laser module, manufactured and sold by Tektronix, Inc., Wilsonville, Oreg. has a backscatter dynamic range of 38 dB as is represented in FIG. 4 at 222. The overall dynamic range for the optical return signal from a fiber under test is greater than the backscatter dynamic range due to the high amplitude reflection 212 generated at the front panel of the OTDR. In order to view the total optical signal, the dynamic range for an optical receiver in the OTDR needs to be in the range of 50 dB as represented in FIG. 4 at 224. It is important to be able to view the total optical return signal all the way to the front panel in order to view any close events, such as event 14 in the fiber. An optical receiver for an OTDR having an overall dynamic range of, for example, 40 dB clips the front panel reflection 212 and the reflective event 214, as shown by line 226, and the existence of event 214 would not be discernible to a user.

Figure 5:
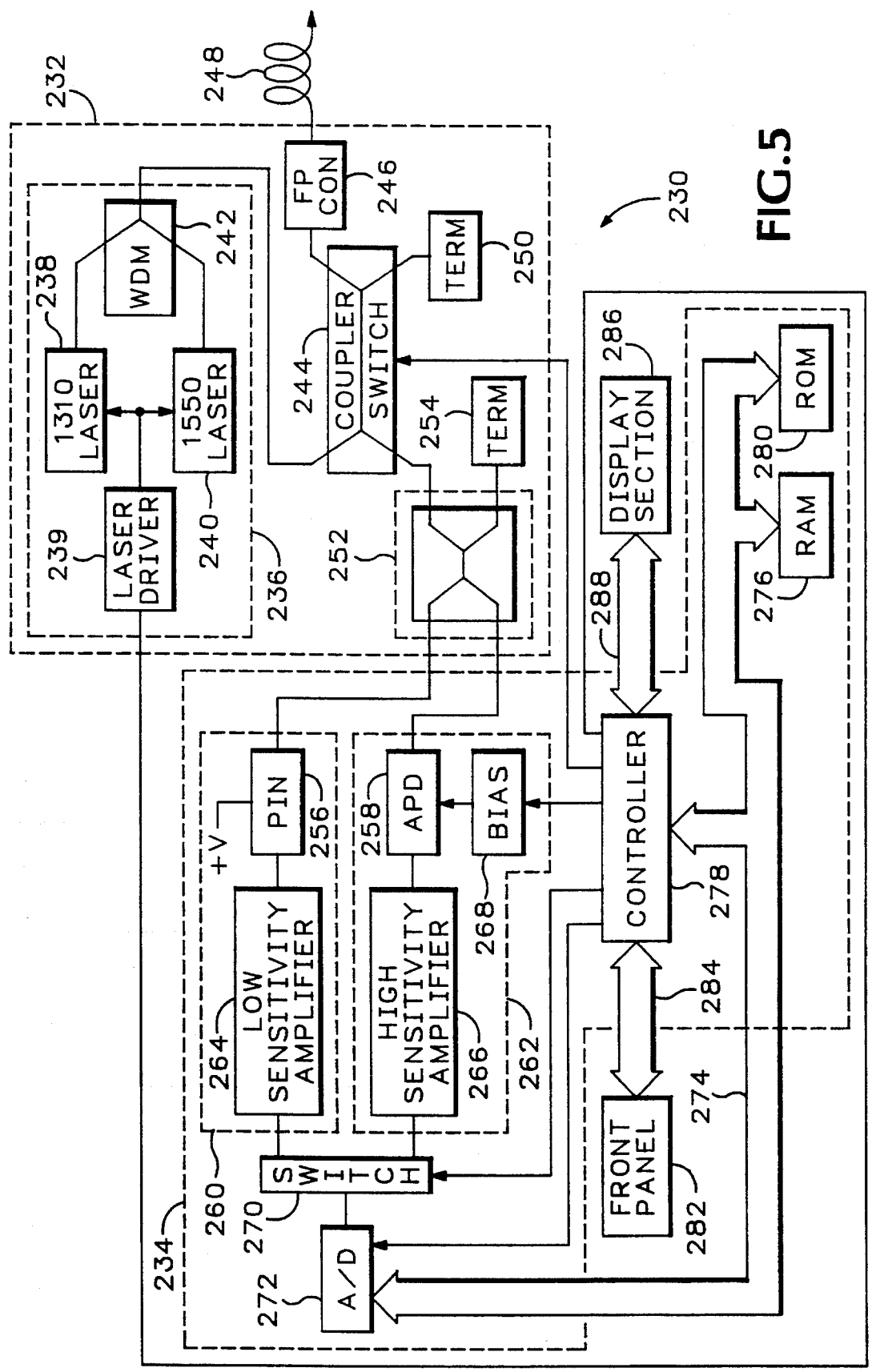
FIG. 5 is a block diagram of an optical time domain reflectometer incorporating the wide dynamic range optical receiver according to the present invention.

Referring to FIG. 5, there is shown a block diagram of an optical time domain reflectometer 230 having an optical section 232 and a wide dynamic range optical receiver section 234. The optical section 232 has a optical pulse generating section 236, which is shown with dual laser diodes 238 and 240 respectively operating at 1310 nanometers and 1550 nanometers. A representative 1310 nm laser having a 100 milliwatt output is manufactured and sold by NEC Corp., Tokyo, Japan, under part number NDL7500P. A representative 1550 nm laser having a 60 milliwatt output is manufactured and sold by NEC Corp., Tokyo, Japan, under part number NDL7550P. A laser driver 239 is connected to the lasers 238 and 240 for selecting and generating variable current drive signals for operating the lasers. The pulsed optical output of the lasers 238 and 240 are coupled through an optical multiplexer or switch 242 to a coupler or switch 244. A suitable multiplexer for use with the above referenced laser diodes is a single mode wavelength division multiplexer (WDM) as manufactured and sold by Gould, Inc., Fiber Optics Division, under part No. 241419 and described as a 1310/1550-COW-MX-02X02 single mode WDM, Series MX. Alternately, the optical generating section 236 may be configured with a single laser diode coupled to coupler/switch 244 without having the laser output passing through multiplexer 242. Further, the operating wavelengths of the laser or lasers are not restricted to those shown and described but may be any type of laser suitable for testing optical communication links.

Coupler/switch 244 is shown as a four port coupler with one port coupled to receive the optical signal from the optical pulse generating section 236. A suitable coupler for this purpose is manufactured and sold by Gould, Inc., Fiber Optics Division, under part No. 241772 and described as a 1270/1600-COS-50/50-02X02 single mode wavelength independent coupler (WIC), Series S. A second port couples the optical signal to a front panel connector 246 which connects a fiber under test 248 to the OTDR 230. A third port is coupled to an optical termination 250. A fourth port is coupled to an optical splitter/coupler 252. Alternately, the passive coupler 244 may be replaced with an active device, such as an acousto-optic or electro-optic switch. These types of devices operate under the control of a controller, such as a microprocessor or the like, to selectively block the high amplitude reflective components of the optical return signal, such as reflections 212, 214, and 218 in FIG. 4, from impinging on a photosensitive device in an optical receiver. With switch 244 in the OFF state, the optical pulse generating section 236 is coupled to the fiber under test 248 via the switch 244 and the front panel connector 246. In the ON state, the switch 244 couples the optical return signal from the fiber under test 248 to the splitter/coupler 252. Switch 244 is turned OFF when a high amplitude reflection is detected in the optical return signal, which routes the return signal to the optical pulse generating section and away from the splitter/coupler 252.

Splitter/coupler 252 is a four port device having a first port coupled to receive the optical return signal from the coupler/switch 244. A second port is terminated by optical termination 254. A third and a forth port are coupled to photosensitive devices 256 and 258 in the optical receiver section 234. Splitter/coupler 252 divides the optical return signal into a first portion having a range ten percent or less of the optical return signal and a remaining portion having a range of ninety percent or more of the optical return signal. A suitable splitter coupler is manufactured and sold by Gould, Inc., Fiber Optics Division, under part No. 242397 and described as a 1270/1600-COS-1/99-02X02 single mode wavelength independent coupler (WIC), Series S. This particular splitter/coupler divides an input optical signal into two portions having a ratio in the range of ninety-five to five depending on the wavelength of the optical return signal. That is five percent of the optical signal is output through port three and ninety-five percent is output through port four. In the implementation of this invention in a commercial product, the output of the splitter/coupler 252 is in the range of a ninety-eight to two ratio for 1310 nm optical return signals and a ninety-five to five ratio for 1550 nm optical return signals.

The outputs of the splitter/coupler 252 are coupled to the wide dynamic range optical receiver section 234. Receiver section 234 embodies the wide dynamic range optical receiver 10 previously described in relation to FIG. 1. The optical receiver 234 has a low sensitivity signal channel 260 and a high sensitivity signal channel 262 with each channel 260 and 262 having respective photosensitive devices 256 and 258 and amplifiers 264 and 266. The photosensitive device 256 in the low sensitivity signal channel 260 is preferably an InGaAs PIN photodiode having unity gain. The photosensitive device 258 in the high sensitivity signal channel 262 is preferably an InGaAs avalanche photodiode (APD) having a variable gain. The APD 258 is housed in a hybrid package for maintaining the APD 258 at a constant temperature for increased sensitivity. These types of hybrid packages for photodetectors are known in the art and are used in similar types of applications. A voltage biasing circuit 268 is connected to the APD 258 for producing a first and a second gain in the diode 258. The low and high sensitivity amplifiers 264 and 266 are implemented in the preferred embodiment as transimpedance amplifiers having similar designs but with different gains.

The respective outputs the low and high sensitivity signal channels 260 and 262 are coupled to a switch 270 that selectively couples the outputs to an analog-to-digital converter (A/D) 272. The A/D 272 converts the received voltage signals from the respective signal channels 260 and 262 to digital values representative of the voltage signals. The digital values are coupled via data and address bus 274 to a random access memory (RAM) 276 for storage. Control of the OTDR is provided by a controller 278, such as a microprocessor or the like, that operates in response to programs stored in read only memory (ROM) 280. Operator instructions and parameter selections, such as laser selection, pulse width for the laser pulses, and the like, are input from a front panel 282 coupled to the controller 278 by bus 284. A display section 286 is also coupled to the controller 278 via bus 288. The display section 286 generates an output for displaying on a display device, such as a cathode-raytube, liquid crystal display, or the like. Various control lines couple the controller 278 to the A/D, the APD voltage bias control 268, the coupler/switch 244 if a active switch is used, and the optical pulse generating section 236.

The operation of the OTDR 230 is described in relation to the block diagram of FIG. 5 and the waveforms of FIGS. 6A–6D. FIGS. 6A–6D are portions of the graphical representation of the optical return signal from a fiber under test shown in FIG. 4. Optical pulses are generated and launched from the optical pulse generating section 236 in response to operator selected parameters entered from the front panel 282. These parameters can include the pulse width of the launched optical pulses, the type of laser to be used if multiple lasers are provided in the instrument, the amount of signal averaging, and the like. The front panel 282 instructions are interpreted by the control 278, which produces laser select and laser driver commands for the laser driver 239. The laser driver produces current pulses for driving the selected laser into conduction for generating an optical pulse output having a pulse frequency ranging from 300 kHz to 5 MHz. The current drive signal from laser driver 239 may be varied in pulse duration and amplitude to vary the pulse width of the launched optical pulses and to reduce the overall optical power of the optical pulses launched into the fiber under test 248. The optical pulse output from lasers 238 or 240 are coupled through the WDM 242, the coupler/switch 244 and the front panel 246 into the fiber under test 248. The optical return signal from the fiber under test, containing Rayleigh backscatter and reflective events, is coupled into the optical splitter 252. Splitter 252 divides the optical power of the optical return signal into first and second optical signal with the first optical signal having ten percent or less of the optical return signal optical power and the second optical signal having ninety percent or more of the optical return signal optical power. As was previously described, the split power ratio of the optical splitter used in the preferred embodiment of the invention is a function of the wavelength of the optical return signal. Other types of optical splitters may be used that are not wavelength dependent. The first optical signal having the substantially reduced optical return signal optical power is coupled to the low sensitivity signal channel 260. The second optical signal having the substantial amount of the optical return signal optical power is coupled to the high sensitivity signal channel 262.

Figure 6A:
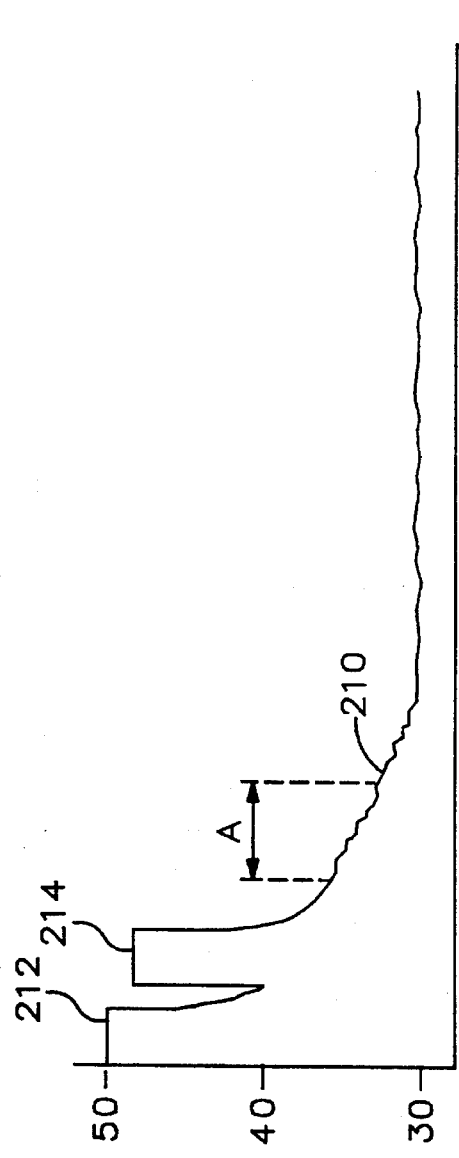
FIGS. 6A–6D are graphical representations of various portions of the optical return signal from the wide dynamic range optical receiver used in an optical time domain reflectometer according to the present invention.

The optical receiver is 234 is configured by the controller to acquire digital values representative of the first optical signal during a first acquisition cycle. During this acquisition cycle the low sensitivity signal channel is coupled to the A/D 272 via switch 270. PIN photodiode 256 receives the first optical signal of the optical return signal and converts the first optical signal into a current signal. The current signal from the PIN diode 256 is coupled to low sensitivity amplifiers 264, which converts the current signal into a voltage signal representative of a first portion of the optical return signal. The voltage signal is coupled via switch 270 to the A/D 272, which converts the voltage signal into digital values in response to commands from controller 278. The sampling frequency of the A/D 272 has a range from 10 to 20 MHz and varies as a function of the pulse width of the optical pulses launched into the fiber under test 248 and the sample spacing of the acquired digital values. The digital values from the A/D are stored in RAM 276. Multiple acquisitions are made of the first optical signal during the first acquisition cycle for signal averaging. FIG. 6A is a waveform representation of the digital values stored during the first acquisition. The waveform shows that the first acquisition of data represents a portion of the optical return signal with the front panel reflection 212 and close in reflection 214. The Rayleigh backscatter signal 210 falls into the electrical noise floor of the low sensitivity amplifiers 264.

Figure 6B:
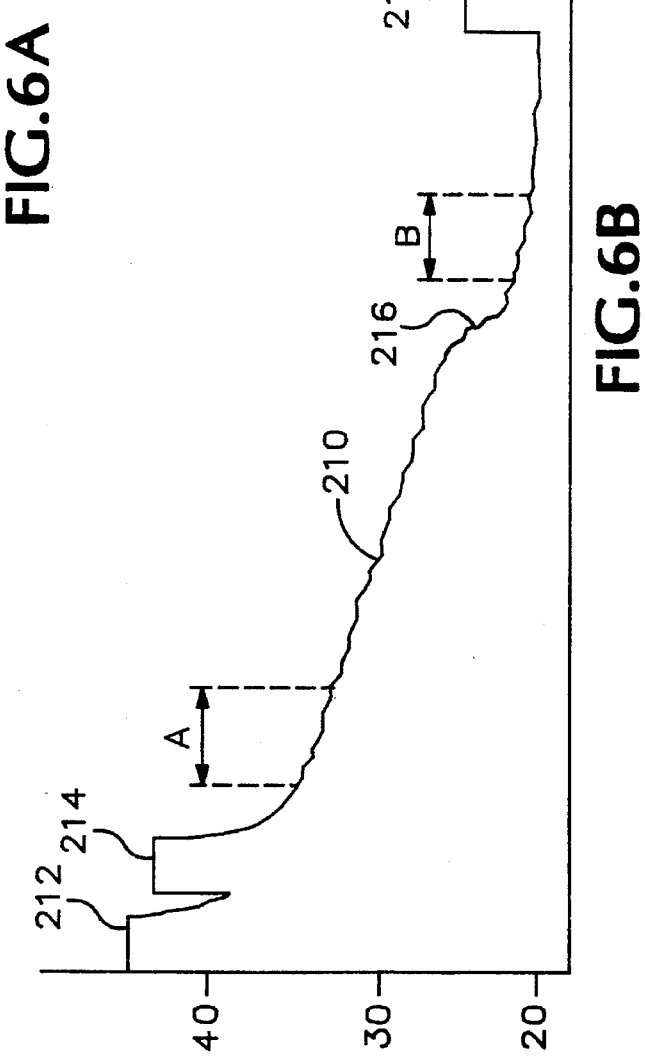

The optical receiver 234 is reconfigured by the controller to acquire digital values representative of the second optical signal during the first of two acquisition cycles. During these two acquisition cycles the high sensitivity signal channel is coupled to the A/D 272 via switch 270. Controller 278 provides an input to voltage biasing circuit 268 for setting the gain of the APD 258. During the first acquisition cycle of the second optical signal, the gain on the APD 258 is set to approximately 1.5 Amp/watt. APD 258 receives the second optical signal of the optical return signal and converts the signal into a current signal. The current signal from the APD 258 is coupled to high sensitivity amplifiers 266, which convert the current signal into a voltage signal representative of a second portion of the optical return signal. The voltage signal is coupled via switch 270 to the A/D 272, which converts the voltage signal into digital values in response to commands from controller 278. The digital values from the A/D are stored in RAM 276. Multiple acquisitions are made of the second optical signal during this acquisition cycle for signal averaging. FIG. 6B is a waveform representation of the digital values stored during the first of two acquisition cycles of the second optical signal. The waveform shows that this acquisition of data represents a portion of the optical return signal with the high sensitivity amplifier 266 being saturated for the front panel and close in reflections 212 and 214. In addition, it shows the Rayleigh backscatter signal 210 falling into the electrical noise floor of the high sensitivity amplifiers 266 but at a lower level that first optical signal using the low sensitivity signal channel 260.

Figure 6C:
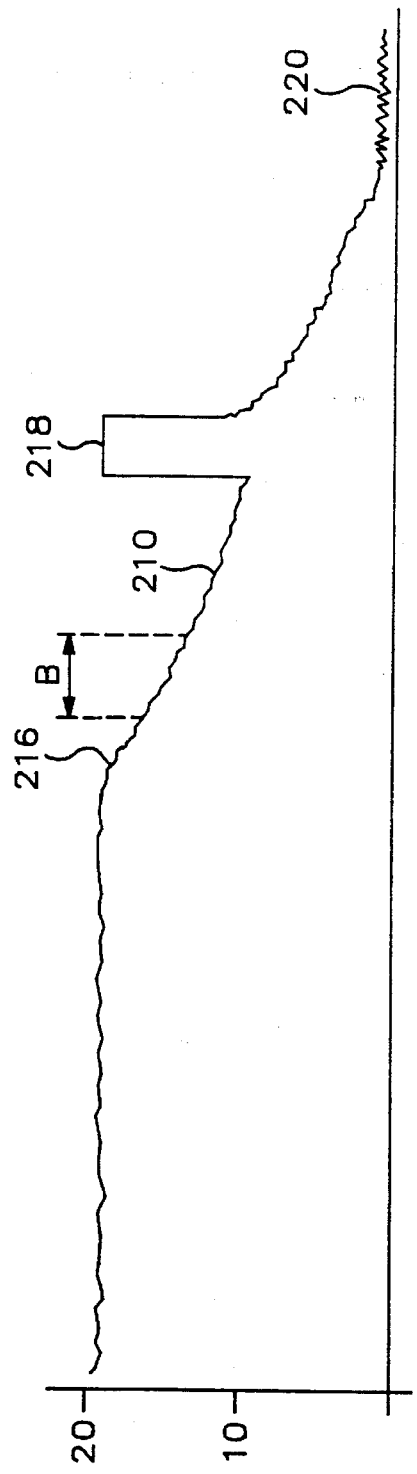

The optical receiver 234 is reconfigured again by the controller to acquire digital values representative of the second optical signal during the second of the two acquisition cycles on the second optical signal. During the second acquisition cycle of the second optical signal, the gain on the APD 258 is set to approximately 32 Amp/watt. APD 258 receives the second optical signal of the optical return signal and converts the signal into a current signal. The current signal from the APD 258 is coupled to high sensitivity amplifiers 266, which convert the current signal into a voltage signal representative of another portion of the optical return signal. The voltage signal is coupled via switch 270 to the A/D 272, which converts the voltage signal into digital values in response to commands from controller 278. The digital values from the A/D are stored in RAM 276. Again, multiple acquisitions are made of the second optical signal during this acquisition cycle for signal averaging. FIG. 6C is a waveform representation of the digital values stored during the second acquisition cycles of the second optical signal. The waveform shows that this acquisition of data represents a portion of the optical return signal with the high sensitivity amplifier 266 being saturated for a substantial part of the acquisition. In addition, it shows the Rayleigh backscatter signal 210 falling into the electrical noise floor 220 of the high sensitivity amplifiers 266 at the signal to noise limit of the OTDR range.

Figure 6D:
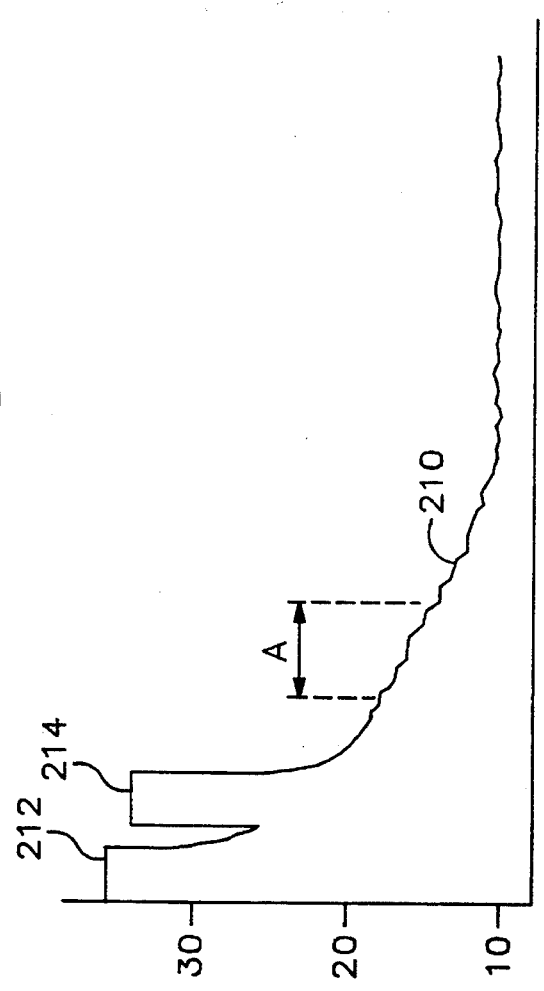

The dynamic range of the optical receiver in the OTDR 230 is a function of the total optical power launched into the fiber under test, the sensitivity of the optical receiver, and the amount of averaging performed on the return optical signal. The use of a 1550 nm laser generating 60 milliwatts of power can saturate the low sensitivity signal channel 260 even with the first optical signal having ten percent or less of the optical return signal power. In such a case, the optical power level of the laser is reduced to a range of one-half to one-third of the original optical power level and an additional acquisition cycle is performed to acquire digital data from the low sensitivity signal channel 264. FIG. 6D is a waveform representation of the digital values stored during the additional acquisition using the reduced power of the laser for the first optical signal of the optical return signal. The waveform shows the optical signal level of the front panel reflection 212 and the close in reflection 214 are substantially lower than the first acquisition using the first optical signal and the low sensitivity signal channel. The Rayleigh backscatter signal 210 is also at a reduced level.

The various portion of the optical return signal represented by the various acquisitions of digital values require both horizontal and vertical correlation. The horizontal correlation is accomplished by correlating in time the digital values of the various acquisitions. The vertical correlation is accomplished by applying magnitude correction values, previously stored in ROM 280 during a calibration process, to the digital values of the various acquisitions and determining common overlapping regions in the various acquisitions where common data points exist. FIGS. 6A–6D show the areas of common overlap. Two criteria are used in determining valid overlapping regions. One is that there are no anomalous events, such as reflections 214 and 218 or non-reflective event 216, in the digital data. Second, signal range represented by the digital values are within the vertical limits of the amplifiers. That is the digital values do not represent signals where the low and high sensitivity signal channels are saturated or where the signal is in the electrical noise floor.

The digital values representative of the various portions of the optical return signal are retrieved from RAM 276 by controller 278. The controller 276 operating under programs stored in ROM 280 constructs a composite digital output representative of the optical return signal. The controller applies magnitude correction values to the various acquisitions to align the various portions of the optical return signal in magnitude. The digital values of the various acquisitions are correlated in time and the digital data from the first acquisition using the first optical signal is compared to the digital data of the first of two acquisitions using the second optical signal to determine regions of common overlap as shown by regions "A" in FIGS. 6A and 6B. When a valid region of common overlap is determined, as represented by "A" the valid digital values representing the optical return signal from one acquisition are spliced together with the valid digital values representing of the optical return signal from the other acquisition. The digital values of the two acquisitions using the second optical signal are compared to determine regions of common overlap as shown by regions "B" in FIGS. 6B and 6C. Again, the valid digital values representing the optical return signal from the two acquisitions using the second optical signal are spliced together. The result of the splicing of the digital values of the various acquisitions is a digital output representative the optical input signal. The resultant digital output is passed through a digitally generated infinite impulse response (IIR) filter for removing high frequency noise in the digital output.

Traditional OTDR design uses a series of discrete third order low pass filters approximating a Bessel filter to remove high frequency noise from the analog voltage signal representative of the optical return signal. It is important to reduce overshoot and ringing in the voltage signal that behaves like an impulse function. The cutoff frequency of each filter is set as a function of the ratio between the pulse frequency of the launched optical pulses from the optical pulse generating section 236 and the sample frequency of the analog-to-digital converter 272. Including discrete analog filters for all pulse frequency/sample frequency ratios would substantially increase the parts count in and cost of the OTDR. Therefore, the characteristic of each analog filter is compromised somewhat by the tolerances of the components used for the filter and a requirement to use the filters for more and one pulse frequency/sample frequency ratio. Using the digitally generated IIR filters eliminates the analog low pass filters thus reducing the total parts count in the OTDR while at the same time matching each filter to a particular pulse frequency/sample frequency ratio.

The infinite impulse response filter is developed from an electrical analysis of the components used for a third order low pass filter approximating a Bessel filter as a function of a particular pulse frequency/sample frequency ratio. The electrical analysis of the low pass analog filter produces component values which are inserted into network equations representing the analog filter. The network equation is a third order polynomial which is broken down in to first and second order polynomials having only real coefficients. The coefficients, along with the values of pulse frequency and sample frequency, are converted using a bilinear transform to produce z domain transfer function coefficients for each filter. The z domain transfer function is implemented using a cascade infinite impulse response filter digital method.

In the case where the additional acquisition was made using the low sensitivity signal channel and the reduced power optical return signal, the digital values of the reduced optical input signal are spliced with the first acquisition of digital values from the low sensitivity signal channel after magnitude correction values are added to the digital values of the reduced power optical return signal. The region of common overlap is shown as "A" in FIGS. 6A and 6D.

The reconstruction of the optical return signal from the various acquisitions using the different signal channels and the different gains on the APD 258 requires the generation of magnitude correction values for the digital data from the various acquisitions. An active calibration method is used to determine the magnitude correction values for the various acquisitions. A fiber with known characteristics is coupled to the front panel connector 246 of the OTDR 230. An optical attenuator is inserted in the optical returns signal path for introducing known amounts of attenuation into the optical return signal. The OTDR 230 is configured for acquiring data from the low sensitivity signal channel 260. An acquisition is made and the resultant digital data is stored. The OTDR 230 is then reconfigured for the high sensitivity signal channel 262 with the APD 258 gain set for approximately 1.5 Amp/watt. Attenuation is added to the optical return path equal to the difference in optical gain levels for the low and high sensitivity channels 260 and 262. In the preferred embodiment the difference in optical gain levels is approximately 8.5 dB. This amount of attenuation is added to the optical return signal path and another acquisition is made and the resultant digital data is stored. A region is selected on the fiber that has no anomalous events and the digital values from that region represent good data. The difference in values between the digital values of the first acquisition and the second acquisition with attenuation is the magnitude correction factor for the second acquisition. The OTDR 230 is set up again for the high sensitivity channel 262 with the gain of the APD 258 set at approximately 32 Amp/watt. The attenuator attenuation is set for approximately 6.5 dB, which is equivalent to the difference in optical gain between the low and high gain setting on the APD 258. Another acquisition of data is make and the resultant digital data is stored. The digital values of the first acquisition using the low gain on the APD 258 are compared to the attenuated digital values of the second acquisition using the high gain on the APD 258 over the same region of fiber with the difference in the values over that region being the magnitude correction factor for the data using the high APD 258 gain. The same process is used when the optical power of the laser 240 is reduced and an additional acquisition is made using the low sensitivity signal channel. The addition acquisition is compared against an attenuated first acquisition using the low sensitivity signal channel to obtain the magnitude correction factor for the additional waveform. The magnitude calibration factors are stored in ROM 280 for use in the reconstruction of digital outputs representative of any optical return signal.

Figure 7:
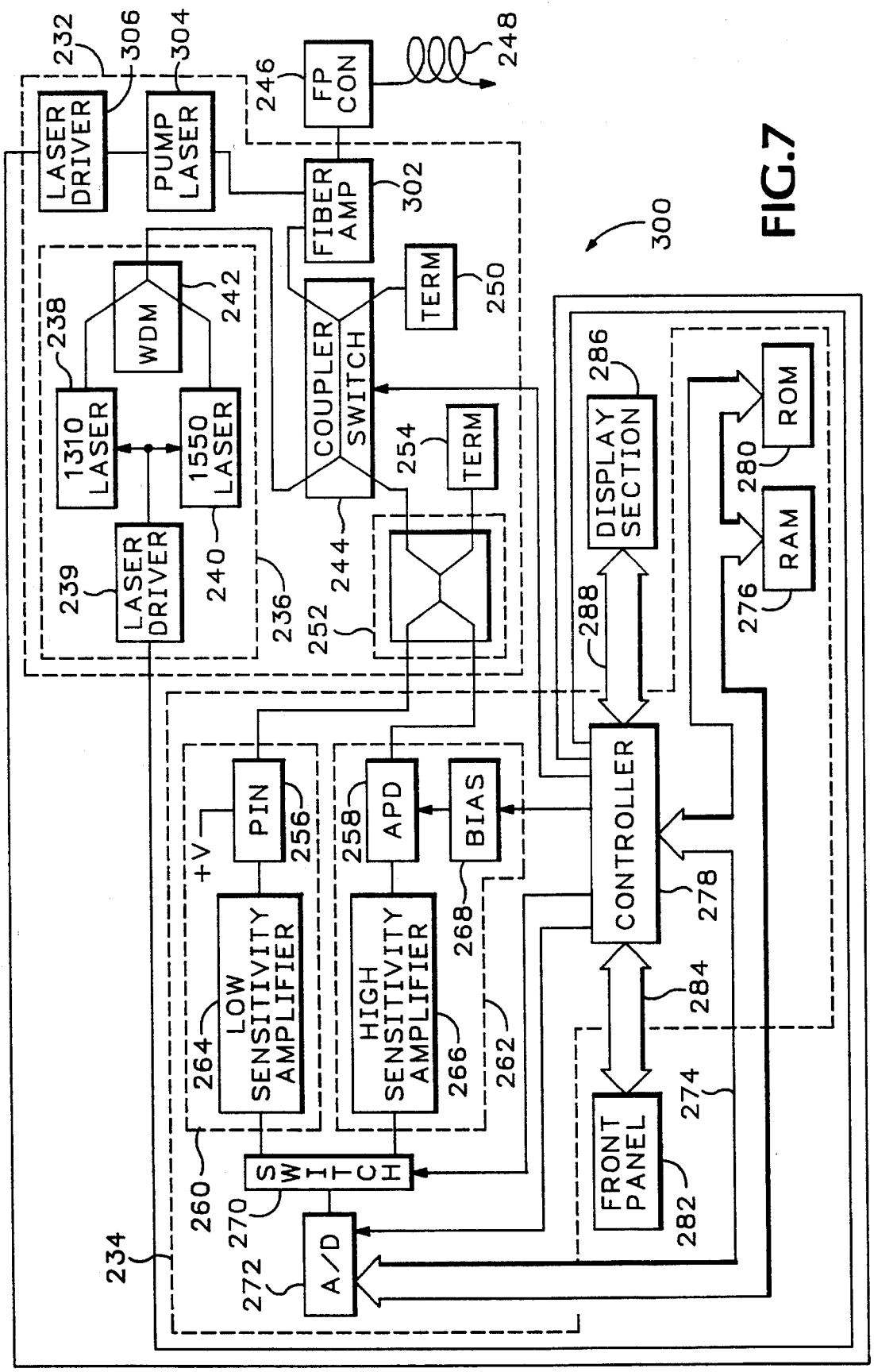
FIG. 7 is a block diagram of an optical time domain reflectometer incorporating a fiber amplifier with the wide dynamic range optical receiver according to the present invention.

Referring to FIG. 7, there is shown an optical time domain reflectometer 300 having an optical section 232 containing a fiber amplifier 302 for increasing the optical power of the optical pulse output from the optical pulse generating section 236. Like elements in FIGS. 5 and 7 are numbered the same. The coupling of the fiber amplifier 302 between the coupler/switch 244 and the front panel connector 246 also amplifies the optical return signal from the fiber under test 248. The fiber amplifier 302 may also be positioned between the optical pulse generating section 236 and the coupler/splitter 244 for amplifying the optical pulse output without amplifying the optical return signal. The fiber amplifier 302 may be an erbium doped fiber amplifier coupled to receive the 1550 nm optical pulse output and an optical pump signal from a 1480 nm pump laser 304. The 1310 nm optical pulse output may require a pump laser operating at a different wavelength and a fiber amplifier that is not doped with erbium. The pump laser 304 is coupled to a laser driver 306 that receives command signals from controller 278.

The operation of the OTDR 300 is similar to the operation of the OTDR 230 previously described. The optical pulse generating section 236 generates optical pulses for launching into the fiber under test 248. The controller 278 initiates command signals to the laser driver 306 for generating a current signal for driving the pump laser 304 into conduction. The output of pump laser 304 is coupled to the fiber amplifier 302. The pumping of the fiber amplifier 302 by the action of the laser 304 output produces up to 20 dB of optical gain in the optical pulse output launched into the fiber under test 248. With the fiber amplifier 302 configured in the OTDR 300, as shown, the optical return signal is also amplified by the fiber amplifier 302. The amplified optical return signal is coupled to the optical splitter 252 via the coupler/switch 244. The optical splitter 252 couples the various portions of the optical return signal to the low and high sensitivity signal channels 260 and 262 of the wide dynamic range optical receiver 234 for producing the composite digital output representative of the optical return signal.

The acquisitions of digital values representative of the various portions of the optical return signal are similar to that previously described. In lieu of, or in addition to, the acquisition where the optical power of the lasers 238 and 240 in the optical signal generating section 236 is reduced so as not to saturate the low sensitivity signal channel 260, the fiber amplifier 302 may be turned off to produce the needed optical power reduction in the launched optical pulses. Turning off the fiber amplifier 302 by shutting off the pump laser output 304 effectively turns the fiber amplifier into a optical attenuator. Irrespective of whether the output power of the optical signal generating section 236 is reduced on the fiber laser 302 is shut off, the intent is to produce digital values representative of various portions of the optical input signal where the low and high sensitivity channels 260 and 262 are not saturated nor noisy. The digital values are combined to produce a composite digital output representative of the optical return signal.

A wide dynamic range optical receiver has been described for use with an optical signal measurement instrument, such an optical time domain reflectometer (OTDR), having low and high sensitivity channels for producing voltage signal representative of various portions of an optical input signal. The voltage values are converted to digital values by an analog-to-digital converter and combined to produce a digital output representative of the optical input signal. The optical input signal is composed of first and second portions referred to as the first and second optical signals with the first optical signal having an optical power level substantially less than the second optical signal. Various optical splitter were described for producing the first and second optical signals. In the preferred embodiment for use in an OTDR, the optical input signal has a first optical signal having ten percent or less of the optical input power and the second optical signal has ninety percent or more of the optical input power. The first signal is coupled to the low sensitivity signal channel and the second signal is coupled to the high sensitivity signal channel. In one embodiment of the optical receiver, the low and high sensitivity channels have individual photosensitive devices with the low sensitivity channel having a unity gain device and the high sensitivity channel having a variable gain device. The gain of the variable gain photosensitive device is set at two levels to produce an equivalent optical gain of approximately 6.5 dB. The gains of the respective amplifiers in the low and high sensitivity channels are set to produce an equivalent optical gain of approximately 8.5 dB resulting in a total equivalent optical gain between the two channels of approximately 15 dB. The combining of the digital values representing the various portions of the optical input signal includes applying magnitude correction values to the digital values for vertically correlating the various portions of the optical input signal. The digital values are horizontally correlated in time and common overlapping regions between the various portions are determined with no anomalous events and the digital values are not associated with the saturation or noise from the electrical noise floor the signal channels. The digital output is passed through an infinite impulse response filter to remove high frequency noise in the digital output. Alternatively, the wide dynamic range optical receiver may use a single variable gain photosensitive device and a switch for coupling the photosensitive device to the low and high sensitivity channels. The gain on the photosensitive device is varied as a function of the coupling of the first and second optical signals of the optical input signal to the low and high sensitivity signal channels. Further, the optical time domain reflectometer may include a fiber amplifier for increasing the optical power of the optical pulse output launched into the fiber under test and/or the optical return signal. The fiber amplifier may also provide attenuation to the optical pulse output where the output saturates the low sensitivity signal channel. These and other aspects of the present invention are set forth in the appended claims.

What is claimed is:

1. A wide dynamic range optical receiver comprising:
   a low sensitivity signal channel for converting a first portion of an optical input signal having a first optical power level being ten percent or less of the optical power of the optical input signal into at least one voltage signal representative of the first portion of the optical input signal;

a high sensitivity signal channel for converting a second portion of the optical input signal having a second optical power level being fifty percent or more of the optical power of the optical input signal into at least one voltage signal representative of the second portion of the optical input signal;

means for converting the voltage signals from the respective low and high sensitivity signal channels into digital values representative of the various portions of the optical input signal; and means for combining the digital values representative of the various portions of the optical input signal to produce a composite digital output representative of the optical input signal.

2. The wide dynamic range optical receiver as recited in claim 1 further comprising the second portion of the optical input signal having ninety percent or more of the optical power of the optical input signal.

3. The wide dynamic range optical receiver as recited in claim 1 further comprising:

a variable gain photosensitive device coupled to selectively receive the first and second portions of the optical input signal for converting the first and second portions into current signals as a function of applying different gains to the photosensitive device for the respective conversions;

a voltage biasing circuit coupled to the variable gain photosensitive device for producing the different gains for the variable gain photosensitive device; and a switch coupled between the photosensitive device and the low and high sensitivity signal channels for coupling the current signal representative of the first portion of the optical input signal to the low sensitivity signal channel and the current signal representative of the second portion of the optical input signal to the high sensitivity signal channel.

4. The wide dynamic range optical receiver as recited in claim 3 wherein the low and high sensitivity signal channels further comprise respective first and second amplifiers for converting the current signals into first and second voltage signals representative of the first and second portions of the optical input signal.

5. The wide dynamic range optical receiver as recited in claim 4 wherein the first amplifier further comprises a linear amplifier.

6. The wide dynamic range optical receiver as recited in claim 4 wherein the first amplifier further comprises a non-linear amplifier.

7. The wide dynamic range optical receiver as recited in claim 4 wherein the second amplifier further comprises a linear amplifier.

8. The wide dynamic range optical receiver as recited in claim 4 wherein the second amplifier further comprises a non-linear amplifier.

9. The wide dynamic range optical receiver as recited in claim 4 wherein the first portion of the optical input signal further comprises a second optical power level as a function of the optical input signal having a reduced optical power level.

10. The wide dynamic range optical receiver as recited in claim 9 wherein the variable gain photosensitive device generates an additional current signal representative of the first portion of the optical input signal as a function of the second optical power level of the optical input signal.

11. The wide dynamic range optical receiver as recited in claim 4 wherein the variable gain photosensitive device generates a first current signal representative of the first portion of the optical input signal in response to a first gain applied by the voltage biasing circuit and second and third current signals representative of the second portion of the optical input signal in response to second and third gains applied by the voltage biasing circuit, the first current signal being converted by the first amplifier to a voltage signal representative of the first portion of the optical input signal and the second and third current signals being converted by the second amplifier to second and third voltage signals representative of the second portion of the optical input signal.

12. The wide dynamic range optical receiver as recited in claim 11 wherein the first portion of the optical input signal further comprises a second optical power level as a function of the optical input signal having a reduced optical power level.

13. The wide dynamic range optical receiver as recited in claim 12 wherein the variable gain photosensitive device generates an additional current signal representative of the first portion of the optical input signal as a function of the second optical power level of the optical input signal.

14. The wide dynamic range optical receiver as recited in claim 1 wherein the combining means further comprises means for correcting for variations in amplitude levels between the various portions of the optical input signal as a function of applying magnitude correction values to the digital values representative of the various portions of the optical input signal.

15. The wide dynamic range optical receiver as recited in claim 14 wherein the combining means further comprises means for constructing the composite digital output representative of the optical input signal as a function of correlating in time the respective digital values representative of the first and second portions of the optical input signal and determining common overlapping regions between the various portions with no events and where the low and high sensitivity signal channels are not noisy nor saturated.

16. The wide dynamic range optical receiver as recited in claim 1 further comprising first and second photosensitive devices coupled to receive the respective first and second portions of the optical input signal for converting the first and second portions into current signals.

17. The wide dynamic range optical receiver as recited in claim 16 further comprising first and second amplifiers coupled to the respective first and second photosensitive devices for converting the current signals from the first and second photosensitive devices into voltage signals representative of the first and second portions of the optical input signal.

18. The wide dynamic range optical receiver as recited in claim 17 wherein the first amplifier further comprises a linear amplifier.

19. The wide dynamic range optical receiver as recited in claim 17 wherein the first amplifier further comprises a non-linear amplifier.

20. The wide dynamic range optical receiver as recited in claim 17 wherein the second amplifier further comprises a linear amplifier.

21. The wide dynamic range optical receiver as recited in claim 17 wherein the second amplifier further comprises a non-linear amplifier.

22. The wide dynamic range optical receiver as recited in claim 17 wherein the first portion of the optical input signal further comprises a second optical power level as a function of the optical input signal having a reduced optical power level.

23. The wide dynamic range optical receiver as recited in claim 22 wherein the first photosensitive device generates an additional current signal representative of the first portion of the optical input signal as a function of the second optical power level of the optical input signal.

24. The wide dynamic range optical receiver as recited in claim 17 wherein the first photosensitive device further comprises a unity gain device.

25. The wide dynamic range optical receiver as recited in claim 17 wherein the second photosensitive device comprises a variable gain photosensitive device having a biasing means for producing first and second gains in the second photosensitive device.

26. The wide dynamic range optical receiver as recited in claim 25 wherein the variable gain photosensitive device generates first and second current signals representative of the second portion of the optical input signal as a function of the first and second gains on the variable photosensitive device, the first and second current signals being converted by the second amplifier to voltage signals representative of the second portion of the optical input signal.

27. The wide dynamic range optical receiver as recited in claim 26 wherein the first portion of the optical input signal further comprises a second optical power level as a function of the optical input signal having a reduced optical power level.

28. The wide dynamic range optical receiver as recited in claim 27 wherein the first photosensitive device generates an additional current signal representative of the first portion of the optical input signal as a function of the second optical power level of the optical input signal.

29. The wide dynamic range optical receiver as recited in claim 1 wherein the converting means further comprises an analog-to-digital converter.

30. The wide dynamic range optical receiver as recited in claim 29 wherein the converting means further comprises a switch for selectively coupling the low and high sensitivity signal channels to the analog-to-digital converter.

31. The wide dynamic range optical receiver as recited in claim 1 wherein the converting means further comprises first and second analog-to-digital converters respectively coupled to the low and high sensitivity signal channels.

32. The wide dynamic range optical receiver as recited in claim 1 further comprising means for storing the digital values representative of the first and second portions of the optical input signal.

33. An optical signal measurement instrument comprising:
  an optical splitter coupled to receive an optical input signal for producing first and second optical signals representative of the optical input signal with the first optical signal having a first optical power level being ten percent or less of the optical power of the optical input signal and the second optical signal having a second optical power level being fifty percent or more of the optical power of the optical input signal;
  a low sensitivity signal channel for converting the first optical signal into at least one voltage signal representative of a first portion of the optical input signal;
  a high sensitivity signal channel for converting the second optical signal into at least one voltage signal representative of a second portion of the optical input signal;
  means for converting the voltage signals from the respective low and high sensitivity signal channels into digital values representative of the various portions of the optical input signal; and
  means for combining the digital values representative of the various portions of the optical input signal to produce a composite digital output representative of the optical input signal.

34. The optical signal measurement instrument as recited in claim 33 wherein the optical splitter comprises an optical coupler for dividing optical input signal into the first and second optical signals with the first optical signal having ten percent or less of the optical power of the optical input signal and the second optical signal having ninety percent or more of the optical power of the optical input signal.

35. The optical signal measurement instrument as recited in claim 33 wherein the optical splitter comprises an optical coupler for equally dividing optical power of the optical input signal between first and second output ports with one of the output ports having the second optical signal and the other port having an optical attenuator coupled thereto for attenuating the optical power therefrom to produce the first optical signal.

36. The optical signal measurement instrument as recited in claim 33 wherein the optical splitter comprises an optical switch having first and second optical paths selectively coupled to a common optical path and responsive to an input signal for selectively coupling the optical input signal on the common optical path along the first path containing an optical attenuator for attenuating the optical input signal to produce the first optical signal and along a second path producing the second optical signal.

37. The optical signal measurement instrument as recited in claim 33 wherein the optical splitter comprises first and second optical switches with each optical switch having first and second optical paths selectively coupled to a common optical path and responsive to an input signal, the first optical paths of the optical switches being coupled together through an optical attenuator and the second optical paths being coupled together for selectively coupling the optical input signal on the first optical switch common path to the second optical switch common path along the first paths containing the optical attenuator for attenuating the optical input signal to produce the first optical signal and along a second paths to produce the second optical signal.

38. The optical signal measurement instrument as recited in claim 33 further comprising:
  a variable gain photosensitive device coupled to the optical splitter for selectively receiving the first and second optical signals for converting the first and second optical signals into current signals as a function of applying different gains to the photosensitive device for the respective conversions;
  a voltage biasing circuit coupled to the variable gain photosensitive device for producing the different gains for the variable gain photosensitive device; and
  a switch coupled to the photosensitive device for coupling the current signals representative of the first and second optical signals to respective first and second amplifiers for converting the currents signals into first and second voltage signals representative of the first and second portions of the optical input signal.

39. The optical signal measurement instrument as recited in claim 38 wherein the first amplifier further comprises a linear amplifier.

40. The optical signal measurement instrument as recited in claim 38 wherein the first amplifier further comprises a non-linear amplifier.

41. The optical signal measurement instrument as recited in claim 38 wherein the second amplifier further comprises a linear amplifier.

42. The optical signal measurement instrument as recited in claim 38 wherein the second amplifier further comprises a non-linear amplifier.

43. The optical signal measurement instrument as recited in claim 38 wherein the first optical signal further comprises a second optical power level as a function of the optical input signal having a reduced optical power level.

44. The optical signal measurement instrument as recited in claim 43 wherein the variable gain photosensitive device generates an additional current signal representative of the first optical signal as a function of the second optical power level of the optical input signal.

45. The optical signal measurement instrument as recited in claim 38 wherein the variable gain photosensitive device generates a first current signal representative of the first optical signal in response to a first gain applied by the voltage biasing circuit and second and third current signals representative of the second optical signal in response to second and third gains applied by the voltage biasing circuit, the first current signal being converted by the first amplifier to a voltage signal representative of the first portion of the optical input signal and the second and third current signals being converted by the second amplifier to second and third voltage signals representative of the second portion of the optical input signal.

46. The optical signal measurement instrument as recited in claim 45 wherein the first optical signal further comprises a second optical power level as a function of the optical input signal having a reduced optical power level.

47. The optical signal measurement instrument as recited in claim 46 wherein the variable gain photosensitive device generates an additional current signal representative of the first optical signal as a function of the second optical power level of the optical input signal.

48. The optical signal measurement instrument as recited in claim 33 wherein the combining means further comprises means for correcting for variations in amplitude levels between the various portions of the optical input signal as a function of applying magnitude correction values to the digital values representative of the various portions of the optical input signal.

49. The optical signal measurement instrument as recited in claim 48 wherein the combining means further comprises means for constructing the composite digital output representative of the optical input signal as a function of correlating in time the respective digital values representative of the first and second portions of the optical input signal and determining common overlapping regions between the various portions with no events and where the low and high sensitivity signal channels are not noisy nor saturated.

50. The optical signal measurement instrument as recited in claim 33 further comprising first and second photosensitive devices coupled to receive the respective first and second optical signals from the optical splitter for converting the first and second optical signals into current signals representative of the first and second optical signals.

51. The optical signal measurement instrument as recited in claim 50 further comprising first and second amplifiers coupled to the respective first and second photosensitive devices for converting the current signals from the first and second photosensitive devices into first and second voltage signals representative of the first and second portions of the optical input signal.

52. The optical signal measurement instrument as recited in claim 51 wherein the first amplifier further comprises a linear amplifier.

53. The optical signal measurement instrument as recited in claim 51 wherein the first amplifier further comprises a non-linear amplifier.

54. The optical signal measurement instrument as recited in claim 51 wherein the second amplifier further comprises a linear amplifier.

55. The optical signal measurement instrument as recited in claim 51 wherein the second amplifier further comprises a non-linear amplifier.

56. The optical signal measurement instrument as recited in claim 51 wherein the first optical signal further comprises a second optical power level as a function of the optical input signal having a reduced optical power level.

57. The optical signal measurement instrument as recited in claim 56 wherein the first photosensitive device generates an additional current signal representative of the first optical signal as a function of the second optical power level of the optical input signal.

58. The optical signal measurement instrument as recited in claim 51 wherein the first photosensitive device further comprises a unity gain device.

59. The optical signal measurement instrument as recited in claim 51 wherein the second photosensitive device comprises a variable gain photosensitive device having a biasing means for producing first and second gains in the second photosensitive device.

60. The optical signal measurement instrument as recited in claim 59 wherein the variable gain photosensitive device generates first and second current signals representative of the second optical signal as a function of the first and second gains on the variable photosensitive device, the first and second current signals being converted by the second amplifier to voltage signals representative of the second portion of the optical input signal.

61. The optical signal measurement instrument as recited in claim 60 wherein the first optical signal further comprises a second optical power level as a function of the optical input signal having a reduced optical power level.

62. The optical signal measurement instrument as recited in claim 61 wherein the first photosensitive device generates an additional current signal representative of the first optical signal as a function of the second optical power level of the optical input signal.

63. The optical signal measurement instrument as recited in claim 33 wherein the converting means further comprises an analog-to-digital converter.

64. The optical signal measurement instrument as recited in claim 63 wherein the converting means further comprises a switch for selectively coupling the low and high sensitivity signal channels to the analog-to-digital converter.

65. The optical signal measurement instrument as recited in claim 33 wherein the converting means further comprises first and second analog-to-digital converters respectively coupled to the low and high sensitivity signal channels.

66. The optical signal measurement instrument as recited in claim 33 further comprising means for storing the digital values representative of the first and second optical signals.

67. An optical time domain reflectometer comprising:
at least one optical signal generating device coupled to receive a current signal from a current drive circuit for generating an optical pulse output for launching into an optical fiber under test;
an optical splitter coupled to receive an optical return signal from the fiber under test for producing first and second optical signals representative of the optical return signal with the first optical signal having a first optical power level being ten percent or less of the optical power of the optical return signal and the second optical signal having a second optical power level being fifty percent or more of the optical power of the optical return signal;

means for coupling the optical pulse output into the optical fiber under test and the optical return signal into the optical splitter;

a low sensitivity signal channel coupled to the optical splitter for converting the first optical signal into at least one voltage signal representative of a first portion of the optical return signal;

a high sensitivity signal channel coupled to the optical splitter for converting the second optical signal into at least one voltage signal representative of a second portion of the optical return signal;

means for converting the voltage signals from the respective low and high sensitivity signal channels into digital values representative of the first and second portions of the optical return signal; and means for combining the digital values representative of the voltage signals from the lower and high sensitivity signal channels to produce a composite digital representation of the optical return signal as a function of correlating in time the respective digital values representative of the first and second portions of the optical return signal and determining common overlapping regions between the various portions with no events where the low and high sensitivity signal channels are not noisy nor saturated.

68. The optical time domain reflectometer as recited in claim 67 further comprising an optical amplifier coupled to receive the optical pulse output from the optical signal generating device for producing an optical pulse output for launching into the fiber under test having an increased optical power level.

69. The optical time domain reflectometer as recited in claim 68 wherein the optical amplifier comprises an optically pumped fiber amplifier coupled to receive the optical pulse output and an optical pump output from a laser source.

70. The optical time domain reflectometer as recited in claim 69 wherein the fiber amplifier produces a first optical pulse output having a first optical power level and a second optical pulse output having a reduced optical power level as a function of the optical pump output of the laser source.

71. The optical time domain reflectometer as recited in claim 70 wherein the fiber amplifier is an erbium doped fiber coupled to receive the optical pump output from the laser source operating at a wavelength of approximately 1480 nm.

72. The optical time domain reflectometer as recited in claim 67 further comprising an optical amplifier coupled to receive the optical pulse output from the optical signal generating device and the optical return signal from the fiber under test for producing an optical pulse output for launching into the fiber under test and an optical return signal having increased optical power levels.

73. The optical time domain reflectometer as recited in claim 72 wherein the optical amplifier comprises an optically pumped fiber amplifier coupled to receive the optical pulse output, the optical return signal, and an optical pump output from a laser source.

74. The optical time domain reflectometer as recited in claim 73 wherein the fiber amplifier produces a first optical pulse output having a first optical power level and a second optical pulse output having a reduced optical power level as a function of the optical pump output of the laser source.

75. The optical time domain reflectometer as recited in claim 74 wherein the fiber amplifier is an erbium doped fiber coupled to receive the optical pump output from the laser source operating at a wavelength of approximately 1480 nm.

76. The optical time domain reflectometer as recited in claim 67 wherein the current drive circuit produces first and second current signals for generating a first optical pulse output having a first optical power level and a second optical pulse output having a reduced optical power level.

77. The optical time domain reflectometer as recited in claim 76 wherein the optical signal generating device further comprises first and second laser diodes with each laser diode selectively coupled to receive the current signals from the current drive circuit for generating optical pulses.

78. The optical time domain reflectometer as recited in claim 77 further comprising a wavelength division multiplexer coupled between the first and second laser diodes and the coupling means for coupling the optical pulse outputs from the first and second laser diodes into the coupling means.

79. The optical time domain reflectometer as recited in claim 67 wherein the coupling means comprises an optical coupler for coupling the optical power of the optical pulses and the optical return signal into selected optical ports.

80. The optical time domain reflectometer as recited in claim 67 wherein the coupling means comprises an optical switch responsive to an input signal for selectively coupling the optical pulse output into the optical fiber under test and the optical return signal into the optical splitter.

81. The optical time domain reflectometer as recited in claim 80 wherein the optical switch comprises an acousto-optic switch.

82. The optical time domain reflectometer as recited in claim 80 wherein the optical switch comprises an electro-optic switch.

83. The optical time domain reflectometer as recited in claim 67 wherein the optical splitter comprises an optical coupler for dividing optical return signal into the first and second optical signals with the first optical signal having ten percent or less of the optical power of the optical return signal and the second optical signal having ninety percent or more of the optical power of the optical return signal.

84. The optical time domain reflectometer as recited in claim 67 wherein the optical splitter comprises an optical coupler for equally dividing optical power of the optical return signal between first and second output ports with one of the output ports having the second optical signal and the other port having an optical attenuator coupled thereto for attenuating the optical power therefrom to produce the first optical signal.

85. The optical time domain reflectometer as recited in claim 67 wherein the optical splitter comprises an optical switch having first and second optical paths selectively coupled to a common optical path and responsive to an input signal for selectively coupling the optical return signal on the common optical path along the first path containing an optical attenuator for attenuating the optical return signal to produce the first optical signal and along a second path producing the second optical signal.

86. The optical time domain reflectometer as recited in claim 67 wherein the optical splitter comprises first and second optical switches with each optical switch having first and second optical paths selectively coupled to a common optical path and responsive to an input signal, the first optical paths of the optical switches being coupled together through an optical attenuator and the second optical paths being coupled together for selectively coupling the optical return signal on the first optical switch common path to the second optical switch common path along the first paths containing the optical attenuator for attenuating the optical return signal to produce the first optical signal and along the second paths to produce the second optical signal.

87. The optical time domain reflectometer as recited in claim 67 further comprising:

a variable gain photosensitive device coupled to the optical splitter for selectively receiving the first and second optical signals for converting the first and second optical signals into current signals as a function of applying different gains to the photosensitive device for the respective conversions;

a voltage biasing circuit coupled to the variable gain photosensitive device for producing the different gains for the variable gain photosensitive device; and a switch coupled between the photosensitive device and the low and high sensitivity signal channels for coupling the current signal representative of the first optical signal to the low sensitivity signal channel and the current signal representative of the second optical signal to the high sensitivity signal channel.

88. The optical time domain reflectometer as recited in claim 87 wherein the low and high sensitivity signal channels further comprise respective first and second amplifiers for converting the current signals into first and second voltage signals representative of the first and second portions of the optical return signal.

89. The optical time domain reflectometer as recited in claim 87 wherein the first amplifier further comprises a linear amplifier.

90. The optical time domain reflectometer as recited in claim 87 wherein the first amplifier further comprises a non-linear amplifier.

91. The optical time domain reflectometer as recited in claim 87 wherein the second amplifier further comprises a linear amplifier.

92. The optical time domain reflectometer as recited in claim 87 wherein the second amplifier further comprises a non-linear amplifier.

93. The optical time domain reflectometer as recited in claim 87 wherein the first optical signal further comprises a second optical power level as a function of the optical return signal having a reduced optical power level.

94. The optical time domain reflectometer as recited in claim 93 wherein the variable gain photosensitive device generates an additional current signal representative of the first optical signal as a function of the second optical power level of the optical return signal.

95. The optical time domain reflectometer as recited in claim 88 wherein the variable gain photosensitive device generates a first current signal representative of the first optical signal in response to a first gain applied by the voltage biasing circuit and second and third current signals representative of the second optical signal in response to second and third gains applied by the voltage biasing circuit, the first current signal being converted by the first amplifier to a voltage signal representative of the first portion of the optical return signal and the second and third current signals being converted by the second amplifier to second and third voltage signals representative of the second portion of the optical return signal.

96. The optical time domain reflectometer as recited in claim 95 wherein the first optical signal further comprises a second optical power level as a function of the optical return signal having a reduced optical power level.

97. The optical time domain reflectometer as recited in claim 96 wherein the variable gain photosensitive device generates an additional current signal representative of the first optical signal as a function of the second optical power level of the optical return signal.

98. The optical time domain reflectometer as recited in claim 67 wherein the combining means further comprises means for correcting for variations in amplitude levels between the various portions of the optical return signal as a function of applying magnitude correction values to the digital values representative of the various portions of the optical return signal.

99. The optical time domain reflectometer as recited in claim 67 wherein the combining means further comprises means for removing high frequency noise from the digital output representative of the optical return signal.

100. The optical time domain reflectometer as recited in claim 99 wherein the removing means comprises a plurality of infinite impulse response filters having respective cutoff frequencies as a functions of the optical pulse output frequency and the converting means sampling frequency.

101. The optical time domain reflectometer as recited in claim 67 further comprising first and second photosensitive devices coupled to the optical splitter for receiving the respective first and second optical signals for converting the first and second optical signals into current signals representative of the first and second optical signals.

102. The optical time domain reflectometer as recited in claim 101 further comprising first and second amplifiers coupled to the respective first and second photosensitive devices for converting the current signals from the first and second photosensitive devices into first and second voltage signals representative of the first and second portions of the optical return signal.

103. The optical time domain reflectometer as recited in claim 102 wherein the first amplifier further comprises a linear amplifier.

104. The optical time domain reflectometer as recited in claim 102 wherein the first amplifier further comprises a non-linear amplifier.

105. The optical time domain reflectometer as recited in claim 102 wherein the second amplifier further comprises a linear amplifier.

106. The optical time domain reflectometer as recited in claim 102 wherein the second amplifier further comprises a non-linear amplifier.

107. The optical time domain reflectometer as recited in claim 102 wherein the first optical signal further comprises a second optical power level as a function of the optical return signal having a reduced optical power level.

108. The optical time domain reflectometer as recited in claim 107 wherein the first photosensitive device generates an additional current signal representative of the first optical signal as a function of the second optical power level of the optical return signal.

109. The optical time domain reflectometer as recited in claim 102 wherein the first photosensitive device further comprises a unity gain device.

110. The optical time domain reflectometer as recited in claim 102 wherein the second photosensitive device comprises a variable gain photosensitive device having a biasing means for producing first and second gains in the second photosensitive device.

111. The optical time domain reflectometer as recited in claim 110 wherein the variable gain photosensitive device generates first and second current signals representative of the second optical signal as a function of the first and second gains on the variable photosensitive device.

112. The optical time domain reflectometer as recited in claim 111 wherein the first optical signal further comprises a second optical power level as a function of the optical return signal having a reduced optical power level.

113. The optical time domain reflectometer as recited in claim 112 wherein the first photosensitive device generates an additional current signal representative of the first optical signal as a function of the second optical power level of the optical return signal.

114. The optical time domain reflectometer as recited in claim 67 wherein the converting means further comprises an analog-to-digital converter.

115. The optical time domain reflectometer as recited in claim 114 wherein the converting means further comprises a switch for selectively coupling the low and high sensitivity signal channels to the analog-to-digital converter.

116. The optical time domain reflectometer as recited in claim 67 wherein the converting means further comprises first and second analog-to-digital converters respectively coupled to the low and high sensitivity signal channels.

117. The optical time domain reflectometer as recited in claim 67 further comprising means for storing the digital values representative of the first and second portions of the optical return signal.

118. An optical time domain reflectometer comprising:

at least one optical signal generating device coupled to receive a current signal from a current drive circuit for generating an optical pulse output for launching into an optical fiber under test;

an optical amplifier coupled to receive the optical pulse output from the optical signal generating device for producing an optical pulse output for launching into the fiber under test having an increased optical power level;

an optical splitter coupled to receive an optical return signal from the fiber under test for producing first and second optical signals representative of the optical return signal with the first optical signal having a first optical power level being ten percent or less of the optical power of the optical return signal and the second optical signal having a second optical power level being fifty percent or more of the optical power of the optical return signal;

means for coupling the optical pulse output into the optical fiber under test and the optical return signal into the optical splitter;

a low sensitivity signal channel coupled to the optical splitter for converting the first optical signal into at least one voltage signal representative of a first portion of the optical return signal;

a high sensitivity signal channel coupled to the optical splitter for converting the second optical signal into at least one voltage signal representative of a second portion of the optical return signal;

means for converting the voltage signals from the respective low and high sensitivity signal channels into digital values representative of the first and second portions of the optical return signal; and means for combining the digital values representative of the voltage signals from the lower and high sensitivity signal channels to produce a composite digital representation of the optical return signal as a function of correlating in time the respective digital values representative of the first and second portions of the optical return signal and determining common overlapping regions between the various portions with no events and where the low and high sensitivity signal channels are not noisy nor saturated.

119. The optical time domain reflectometer as recited in claim 118 wherein the optical amplifier comprises an optically pumped fiber amplifier coupled to receive the optical pulse output and an optical pump output from a laser source.

120. The optical time domain reflectometer as recited in claim 119 wherein the fiber amplifier produces a first optical pulse output having a first optical power level and a second optical pulse output having a reduced optical power level as a function of the optical pump output of the laser source.

121. The optical time domain reflectometer as recited in claim 120 wherein the fiber amplifier is an erbium doped fiber coupled to receive the optical pump output from the laser source operating at a wavelength of approximately 1480 nm.

122. The optical time domain reflectometer as recited in claim 118 further comprising an optical amplifier coupled to receive the optical pulse output from the optical signal generating device and the optical return signal from the fiber under test for producing an optical pulse output for launching into the fiber under test and an optical return signal having an increased optical power level.

123. The optical time domain reflectometer as recited in claim 122 wherein the optical amplifier comprises an optically pumped fiber amplifier coupled to receive the optical pulse output, the optical return signal, and an optical pump output from a laser source.

124. The optical time domain reflectometer as recited in claim 123 wherein the fiber amplifier produces a first optical pulse output having a first optical power level and a second optical pulse output having a reduced optical power level as a function of the optical pump output of the laser source.

125. The optical time domain reflectometer as recited in claim 124 wherein the fiber amplifier is an erbium doped fiber coupled to receive the optical pump output from the laser source operating at a wavelength of approximately 1480 nm.

126. The optical time domain reflectometer as recited in claim 121 wherein the current drive circuit produces first and second current signals for generating a first optical pulse output having a first optical power level and a second optical pulse output having a reduced optical power level.

127. The optical time domain reflectometer as recited in claim 126 wherein the optical generating device further comprises first and second laser diodes with each laser diode selectively coupled to receive the current signals from the current drive circuit for generating optical pulses.

128. The optical time domain reflectometer as recited in claim 127 further comprising a wavelength division multiplexer coupled between the first and second laser diodes and the coupling means for coupling the optical pulse outputs from the first and second laser diodes into the coupling means.

129. The optical time domain reflectometer as recited in claim 118 wherein the coupling means comprises an optical coupler for coupling the optical power of the optical pulses and the optical return signal into selected optical ports.

130. The optical time domain reflectometer as recited in claim 118 wherein the coupling means comprises an optical switch responsive to an input signal for selectively coupling the optical pulse output into the optical fiber under test and the optical return signal into the optical splitter.

131. The optical time domain reflectometer as recited in claim 130 wherein the optical switch comprises an acousto-optic switch.

132. The optical time domain reflectometer as recited in claim 130 wherein the optical switch comprises an electro-optic switch.

133. The optical time domain reflectometer as recited in claim 118 wherein the optical splitter comprises an optical coupler for dividing optical return signal into the first and second optical signals with the first optical signal having ten percent or less of the optical power of the optical return signal and the second optical signal having ninety percent or more of the optical power of the optical return signal.

134. The optical time domain reflectometer as recited in claim 118 wherein the optical splitter comprises an optical coupler for equally dividing optical power of the optical return signal between first and second output ports with one of the output ports having the second optical signal and the other port having an optical attenuator coupled thereto for attenuating the optical power therefrom to produce the first optical signal.

135. The optical time domain reflectometer as recited in claim 118 wherein the optical splitter comprises an optical switch having first and second optical paths selectively coupled to a common optical path and responsive to an input signal for selectively coupling the optical return signal on the common optical path along the first path containing an optical attenuator for attenuating the optical return signal to produce the first optical signal and along a second path producing the second optical signal.

136. The optical time domain reflectometer as recited in claim 118 wherein the optical splitter comprises first and second optical switches with each optical switch having first and second optical paths selectively coupled to a common optical path and responsive to an input signal, the first optical paths of the optical switches being coupled together through an optical attenuator and the second optical paths being coupled together for selectively coupling the optical return signal on the first optical switch common path to the second optical switch common path along the first paths containing the optical attenuator for attenuating the optical return signal to produce the first optical signal and along the second paths to produce the second optical signal.

137. The optical time domain reflectometer as recited in claim 118 further comprising:

a variable gain photosensitive device coupled to the optical splitter for selectively receiving the first and second optical signals for converting the first and second optical signals into current signals as a function of applying different gains to the photosensitive device for the respective conversions;

a voltage biasing circuit coupled to the variable gain photosensitive device for producing the different gains for the variable gain photosensitive device; and a switch coupled between the photosensitive device and the low and high sensitivity signal channels for coupling the current signal representative of the first optical signal to the low sensitivity signal channel and the current signal representative of the second optical signal to the high sensitivity signal channel.

138. The optical time domain reflectometer as recited in claim 137 wherein the low and high sensitivity signal channels further comprise respective first and second amplifiers for converting the current signals into first and second voltage signals representative of the first and second portions of the optical return signal.

139. The optical time domain reflectometer as recited in claim 137 wherein the first amplifier further comprises a linear amplifier.

140. The optical time domain reflectometer as recited in claim 137 wherein the first amplifier further comprises a non-linear amplifier.

141. The optical time domain reflectometer as recited in claim 137 wherein the second amplifier further comprises a linear amplifier.

142. The optical time domain reflectometer as recited in claim 137 wherein the second amplifier further comprises a non-linear amplifier.

143. The optical time domain reflectometer as recited in claim 138 wherein the first optical signal further comprises a second optical power level as a function of the optical return signal having a reduced optical power level.

144. The optical time domain reflectometer as recited in claim 143 wherein the variable gain photosensitive device generates an additional current signal representative of the first optical signal as a function of the second optical power level of the optical return signal.

145. The optical time domain reflectometer as recited in claim 138 wherein the variable gain photosensitive device generates a first current signal representative of the first optical signal in response to a first gain applied by the voltage biasing circuit and second and third current signals representative of the second optical signal in response to second and third gains applied by the voltage biasing circuit, the first current signal being converted by the first amplifier to a voltage signal representative of the first portion of the optical return signal and the second and third current signals being converted by the second amplifier to second and third voltage signals representative of the second portion of the optical return signal.

146. The optical time domain reflectometer as recited in claim 145 wherein the first optical signal further comprises a second optical power level as a function of the optical return signal having a reduced optical power level.

147. The optical time domain reflectometer as recited in claim 146 wherein the variable gain photosensitive device generates an additional current signal representative of the first optical signal as a function of the second optical power level of the optical return signal.

148. The optical time domain reflectometer as recited in claim 118 wherein the combining means further comprises means for correcting for variations in amplitude levels between the various portions of the optical return signal as a function of applying magnitude correction values to the digital values representative of the various portions of the optical return signal.

149. The optical time domain reflectometer as recited in claim 118 wherein the combining means further comprises means for removing high frequency noise from the digital output representative of the optical return signal.

150. The optical time domain reflectometer as recited in claim 149 wherein the removing means comprises a plurality of infinite impulse response filters having respective cutoff frequencies as a functions of the optical pulse output frequency and the converting means sampling frequency.

151. The optical time domain reflectometer as recited in claim 118 further comprising first and second photosensitive devices coupled to the optical splitter for receiving the respective first and second optical signals for converting the first and second optical signals into current signals representative of the first and second optical signals.

152. The optical time domain reflectometer as recited in claim 151 further comprising first and second amplifiers coupled to the respective first and second photosensitive devices for converting the current signals from the first and second photosensitive devices into first and second voltage signals representative of the first and second portions of the optical return signal.

153. The optical time domain reflectometer as recited in claim 152 wherein the first amplifier further comprises a linear amplifier.

154. The optical time domain reflectometer as recited in claim 152 wherein the first amplifier further comprises a non-linear amplifier.

155. The optical time domain reflectometer as recited in claim 152 wherein the second amplifier further comprises a non-linear amplifier.

156. The optical time domain reflectometer as recited in claim 152 wherein the second amplifier further comprises a non-linear amplifier.

157. The optical time domain reflectometer as recited in claim 152 wherein the first optical signal further comprises a second optical power level as a function of the optical return signal having a reduced optical power level.

158. The optical time domain reflectometer as recited in claim 157 wherein the first photosensitive device generates an additional current signal representative of the first optical signal as a function of the second optical power level of the optical return signal.

159. The optical time domain reflectometer as recited in claim 152 wherein the first photosensitive device further comprises a unity gain device.

160. The optical time domain reflectometer as recited in claim 152 wherein the second photosensitive device comprises a variable gain photosensitive device having a biasing means for producing first and second gains in the second photosensitive device.

161. The optical time domain reflectometer as recited in claim 160 wherein the variable gain photosensitive device generates first and second current signals representative of the second optical signal as a function of the first and second gains on the variable photosensitive device.

162. The optical time domain reflectometer as recited in claim 161 wherein the first optical signal further comprises a second optical power level as a function of the optical return signal having a reduced optical power level.

163. The optical time domain reflectometer as recited in claim 162 wherein the unity gain photosensitive device generates an additional current signal representative of the first optical signal as a function of the second optical power level 0f the optical return signal.

164. The optical time domain reflectometer as recited in claim 118 wherein the converting means further comprises an analog-to-digital converter.

165. The optical time domain reflectometer as recited in claim 164 wherein the converting means further comprises a switch for selectively coupling the low and high sensitivity signal channels to the analog-to-digital converter.

166. The optical time domain reflectometer as recited in claim 118 wherein the converting means further comprises first and second analog-to-digital converters respectively coupled to the low and high sensitivity signal channels.

167. The optical time domain reflectometer as recited in claim 118 further comprising means for storing the digital values representative of the first and second portions of the optical return signal.

168. A method of generating a digital output representative of an optical input signal comprising:

splitting the optical input signal into first and second optical signals with the first optical signal having ten percent of less of the optical power of the optical input signal and the second optical signal having fifty percent or more of the optical power of the optical input signal;

converting the first optical signal into at least one voltage signal representative of a first portion of the optical input signal using a low sensitivity signal channel;

converting the second optical signal into at least one voltage signal representative of a second portion of the optical input signal using a high sensitivity signal channel;

converting the voltage signals from the respective low and high sensitivity signal channels into digital values representative of the various portions of the optical input signal; and combining the digital values representative of the various portions of the optical input signal to produce a composite digital output representative of the optical input signal.

169. The method as recited in claim 168 wherein the splitting step further comprises dividing the optical input signal into the first and second optical signals with the first optical signal having ten percent or less of the optical power of the optical input signal and the second optical signal having ninety percent or more of the optical power of the optical input signal.

170. The method as recited in claim 168 wherein the converting steps of the first and second optical signals further comprises the steps of:

selectively coupling the first and second optical signals to a variable gain photosensitive device;

applying different gains to the photosensitive device for generating a first current signal representative of the first optical signal in response to a first gain and a second current signal representative of the second optical signal in response to a second gain; and coupling the current signals representative of the first and second optical signals to respective first and second amplifiers for converting the currents signals into first and second voltage signals representative of the first and second portions of the optical input signal.

171. The method as recited in claim 170 wherein the applying step further comprises the steps of:

generating an additional optical input signal having a reduced power level; and generating an additional current signal representative of the first optical signal as a function of the reduced power level of the additional optical input signal using the first gain of the photosensitive device.

172. The method as recited in claim 170 wherein the applying step further comprises the steps of:

applying a first gain to the photosensitive device for generating a first current signal representative of the first optical signal and second and third gains to the photosensitive device for generating second and third current signals representative of the second optical signal; and coupling the current signals representative of the first and second optical signals to respective first and second amplifiers for converting the first current signal into a first voltage representative of the first portion of the optical input signal and second and third voltages representative of the second portion of the optical input signal.

173. The method as recited in claim 172 wherein the applying step further comprises the steps of:

generating an additional optical input signal having a reduced power level; and generating an additional current signal representative of the first optical signal as a function of the reduced power level of the additional optical input signal using the first gain of the photosensitive device.

174. The method as recited in claim 168 wherein the combining step further comprises the step of correcting for variations in amplitude levels between the various portions of the optical input signal as a function of applying magnitude correction values to the digital values representative of the various portions of the optical input signal.

175. The method as recited in claim 174 wherein the combining step further comprises the step of constructing the composite digital output representative of the optical input signal as a function of correlating in time the respective digital values representative of the first and second portions of the optical input signal and determining common overlapping regions between the various portions with no events where the low and high sensitivity signal channels are not noisy nor saturated.

176. The method as recited in claim 175 further comprising the step of passing the digital output through a digitally generated infinite impulse response filter for removing high frequency noise from the digital output.

177. The method as recited in claim 168 wherein the converting steps of the first and second optical signals further comprises the steps of:

coupling the first and second optical signals to respective first and second photosensitive device for converting the first and second optical signals into current signals; and coupling the current signals representative of the first and second optical signals to respective first and second amplifiers for converting the currents signals into first and second voltage signals representative of the first and second portions of the optical input signal.

178. The method as recited in claim 177 wherein the first coupling step further comprises:

generating an additional optical input signal having a reduced power level; and generating an additional current signal representative of the first optical signal as a function of the reduced power level of the additional optical input signal.

179. The method as recited in claim 177 wherein the first coupling step further comprises the steps of:

coupling the first optical signal to a unity gain photosensitive device and coupling the second optical signal to a variable gain photosensitive device and;

applying first and second gains to variable gain photosensitive device for generating first and second current signals representative of the second optical signal.

180. The method as recited in claim 179 wherein the first coupling step further comprises:

generating an additional optical input signal having a reduced power level; and generating an additional current signal representative of the first optical signal as a function of the reduced power level of the additional optical input signal.

* * * * *